United States Patent
Haney

(10) Patent No.: US 9,015,471 B2
(45) Date of Patent: *Apr. 21, 2015

(54) INTER-AUTONOMOUS NETWORKING INVOLVING MULTIPLE SERVICE PROVIDERS

(71) Applicant: AlterWAN, Inc., Union City, CA (US)

(72) Inventor: Richard D. Haney, Union City, CA (US)

(73) Assignee: AlterWAN, Inc., Union City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,838

(22) Filed: Sep. 10, 2013

(65) Prior Publication Data
US 2014/0071829 A1 Mar. 13, 2014

Related U.S. Application Data

(63) Continuation of application No. 11/942,616, filed on Nov. 19, 2007, now Pat. No. 8,595,478, which is a continuation of application No. 11/299,110, filed on Dec. 9, 2005, now Pat. No. 7,318,152, which is a continuation of application No. 09/613,004, filed on Jul. 10, 2000, now Pat. No. 7,111,163.

(51) Int. Cl.
| | | |
|---|---|---|
| H04L 29/06 | (2006.01) |
| G06F 15/16 | (2006.01) |
| H04L 12/28 | (2006.01) |
| H04L 12/801 | (2013.01) |
| H04L 12/46 | (2006.01) |
| H04L 12/715 | (2013.01) |
| H04L 12/733 | (2013.01) |
| H04L 12/721 | (2013.01) |

(52) U.S. Cl.
CPC ............ *H04L 47/12* (2013.01); *H04L 12/4633* (2013.01); *H04L 45/04* (2013.01); *H04L 45/20* (2013.01); *H04L 63/0209* (2013.01); *H04L 45/12* (2013.01)

(58) Field of Classification Search
None
See application file for complete search history.

(56) References Cited

U.S. PATENT DOCUMENTS

| | | |
|---|---|---|
| 4,413,338 A | 11/1983 | Renoulin et al. |
| 4,456,957 A | 6/1984 | Schieltz |
| 4,736,363 A | 4/1988 | Aubin et al. |
| 4,742,512 A | 5/1988 | Akashi et al. |
| 4,897,874 A | 1/1990 | Lidinsky et al. |
| 4,907,224 A | 3/1990 | Scoles et al. |

(Continued)

OTHER PUBLICATIONS

Request for Comments (RFC) 1126. Oct. 1989—Entire document.
(Continued)

*Primary Examiner* — Christopher Revak

(57) ABSTRACT

A wide area network using the internet as a backbone utilizing specially selected ISX/ISP providers whose routers route packets of said wide area network along private tunnels through the internet comprised of high bandwidth, low hop-count data paths. Firewalls are provided at each end of each private tunnel which recognize IP packets addressed to devices at the other end of the tunnel and encapsulate these packets in other IP packets which have a header which includes as the destination address, the IP address of the untrusted side of the firewall at the other end of the tunnel. The payload sections of these packets are the original IP packets and are encrypted and decrypted at both ends of the private tunnel using the same encryption algorithm using the same key or keys.

21 Claims, 3 Drawing Sheets

(56) References Cited

U.S. PATENT DOCUMENTS

| | | |
|---|---|---|
| 4,922,503 A | 5/1990 | Leone |
| 4,933,933 A | 6/1990 | Dally et al. |
| 4,980,822 A | 12/1990 | Brantley, Jr. et al. |
| 5,008,882 A | 4/1991 | Peterson et al. |
| 5,014,265 A | 5/1991 | Hahne et al. |
| 5,023,780 A | 6/1991 | Brearley |
| 5,048,011 A | 9/1991 | Melen |
| 5,067,127 A | 11/1991 | Ochiai |
| 5,105,424 A | 4/1992 | Flaig et al. |
| 5,115,433 A | 5/1992 | Baran et al. |
| 5,117,350 A | 5/1992 | Parrish et al. |
| 5,134,690 A | 7/1992 | Samatham |
| 5,157,692 A | 10/1992 | Horie et al. |
| 5,170,482 A | 12/1992 | Shu et al. |
| 5,218,676 A | 6/1993 | Ben-Ayed et al. |
| 5,239,584 A | 8/1993 | Hershey et al. |
| 5,253,248 A | 10/1993 | Dravida et al. |
| 5,267,232 A | 11/1993 | Katsube et al. |
| 5,274,631 A | 12/1993 | Bhardwaj |
| 5,353,283 A | 10/1994 | Tsuchiya |
| 5,386,413 A | 1/1995 | McAuley et al. |
| 5,390,173 A | 2/1995 | Spinney et al. |
| 5,432,790 A | 7/1995 | Hluchyj et al. |
| 5,436,886 A | 7/1995 | McGill |
| 5,455,865 A | 10/1995 | Perlman |
| 5,467,343 A | 11/1995 | Lee et al. |
| 5,488,608 A | 1/1996 | Flammer, III |
| 5,497,504 A | 3/1996 | Acampora et al. |
| 5,511,168 A | 4/1996 | Perlman et al. |
| 5,515,363 A | 5/1996 | Ben-Nun et al. |
| 5,517,620 A | 5/1996 | Hashimoto et al. |
| 5,533,198 A | 7/1996 | Thorson |
| 5,541,922 A | 7/1996 | Pyhalammi |
| 5,548,646 A | 8/1996 | Aziz et al. |
| 5,550,816 A | 8/1996 | Hardwick et al. |
| 5,581,544 A | 12/1996 | Hamada et al. |
| 5,581,703 A | 12/1996 | Baugher et al. |
| 5,583,990 A | 12/1996 | Birrittella et al. |
| 5,588,060 A | 12/1996 | Aziz |
| 5,594,732 A | 1/1997 | Bell et al. |
| 5,596,719 A | 1/1997 | Ramakrishnan et al. |
| 5,602,836 A | 2/1997 | Papadopoulos et al. |
| 5,617,421 A | 4/1997 | Chin et al. |
| 5,634,006 A | 5/1997 | Baugher et al. |
| 5,649,108 A | 7/1997 | Spiegel et al. |
| 5,650,936 A | 7/1997 | Loucks et al. |
| 5,659,542 A | 8/1997 | Bell et al. |
| 5,671,224 A | 9/1997 | Pyhalammi et al. |
| 5,673,265 A | 9/1997 | Gupta et al. |
| 5,674,003 A | 10/1997 | Andersen et al. |
| 5,675,573 A | 10/1997 | Karol et al. |
| 5,684,800 A | 11/1997 | Dobbins et al. |
| 5,687,167 A | 11/1997 | Bertin et al. |
| 5,699,347 A | 12/1997 | Callon |
| 5,701,465 A | 12/1997 | Baugher et al. |
| 5,717,689 A | 2/1998 | Ayanoglu |
| 5,724,513 A | 3/1998 | Ben-Nun et al. |
| 5,740,176 A | 4/1998 | Gupta et al. |
| 5,745,480 A | 4/1998 | Behtash et al. |
| 5,745,694 A | 4/1998 | Egawa et al. |
| 5,751,967 A | 5/1998 | Raab et al. |
| 5,752,003 A | 5/1998 | Hart |
| 5,754,543 A * | 5/1998 | Seid .............................. 370/351 |
| 5,764,740 A | 6/1998 | Holender |
| 5,764,961 A | 6/1998 | Bhat |
| 5,768,527 A | 6/1998 | Zhu et al. |
| 5,777,986 A | 7/1998 | Grossman |
| 5,781,549 A | 7/1998 | Dai |
| 5,787,080 A | 7/1998 | Hulyalkar et al. |
| 5,787,086 A | 7/1998 | McClure et al. |
| 5,790,546 A | 8/1998 | Dobbins et al. |
| 5,796,719 A | 8/1998 | Peris et al. |
| 5,797,035 A | 8/1998 | Birrittella et al. |
| 5,799,017 A | 8/1998 | Gupta et al. |
| 5,805,803 A | 9/1998 | Birrell et al. |
| 5,822,612 A | 10/1998 | Thomas et al. |
| 5,826,029 A | 10/1998 | Gore, Jr. et al. |
| 5,828,846 A | 10/1998 | Kirby et al. |
| 5,831,971 A | 11/1998 | Bonomi et al. |
| 5,831,975 A | 11/1998 | Chen et al. |
| 5,835,710 A | 11/1998 | Nagami et al. |
| 5,838,663 A | 11/1998 | Elwalid et al. |
| 5,838,683 A | 11/1998 | Corley et al. |
| 5,844,890 A | 12/1998 | Delp et al. |
| 5,859,835 A | 1/1999 | Varma et al. |
| 5,864,540 A | 1/1999 | Bonomi et al. |
| 5,864,542 A | 1/1999 | Gupta et al. |
| 5,867,494 A | 2/1999 | Krishnaswamy et al. |
| 5,867,495 A | 2/1999 | Elliott et al. |
| 5,867,663 A | 2/1999 | McClure et al. |
| 5,870,396 A | 2/1999 | Abu-Amara et al. |
| 5,872,783 A | 2/1999 | Chin |
| 5,886,993 A | 3/1999 | Ruszczyk et al. |
| 5,892,764 A | 4/1999 | Riemann et al. |
| 5,892,924 A | 4/1999 | Lyon et al. |
| 5,896,386 A | 4/1999 | Johnston |
| 5,898,668 A | 4/1999 | Shaffer |
| 5,898,830 A | 4/1999 | Wesinger, Jr. et al. |
| 5,903,559 A | 5/1999 | Acharya et al. |
| 5,907,822 A | 5/1999 | Prieto, Jr. |
| 5,909,440 A | 6/1999 | Ferguson et al. |
| 5,917,822 A | 6/1999 | Lyles et al. |
| 5,920,705 A | 7/1999 | Lyon et al. |
| 5,926,459 A | 7/1999 | Lyles et al. |
| 5,926,463 A | 7/1999 | Ahearn et al. |
| 5,933,425 A | 8/1999 | Iwata |
| 5,941,952 A | 8/1999 | Thomas et al. |
| 5,943,321 A | 8/1999 | St-Hilaire et al. |
| 5,946,311 A | 8/1999 | Alexander, Jr. et al. |
| 5,953,318 A | 9/1999 | Nattkemper et al. |
| 5,953,350 A | 9/1999 | Higgins |
| 5,961,651 A | 10/1999 | Gittins et al. |
| 5,970,062 A | 10/1999 | Bauchot |
| 5,970,064 A | 10/1999 | Clark et al. |
| 5,970,229 A | 10/1999 | Thomas et al. |
| 5,970,232 A | 10/1999 | Passint et al. |
| 5,974,496 A | 10/1999 | Miller |
| 5,983,278 A | 11/1999 | Chong et al. |
| 5,995,503 A | 11/1999 | Crawley et al. |
| 5,995,995 A | 11/1999 | Thomas et al. |
| 5,999,518 A | 12/1999 | Nattkemper et al. |
| 5,999,525 A | 12/1999 | Krishnaswamy et al. |
| 6,002,935 A | 12/1999 | Wang |
| 6,006,264 A | 12/1999 | Colby et al. |
| 6,009,077 A | 12/1999 | Firoiu et al. |
| 6,009,081 A | 12/1999 | Wheeler et al. |
| 6,011,776 A | 1/2000 | Berthaud et al. |
| 6,012,152 A | 1/2000 | Douik et al. |
| 6,014,694 A | 1/2000 | Aharoni et al. |
| 6,023,453 A | 2/2000 | Ruutu et al. |
| 6,023,456 A | 2/2000 | Chapman et al. |
| 6,028,842 A | 2/2000 | Chapman et al. |
| 6,028,843 A | 2/2000 | Delp et al. |
| 6,028,860 A | 2/2000 | Laubach et al. |
| 6,028,933 A | 2/2000 | Heer et al. |
| 6,031,832 A | 2/2000 | Turina |
| 6,031,845 A | 2/2000 | Walding |
| 6,038,217 A | 3/2000 | Lyles |
| 6,038,230 A | 3/2000 | Ofek |
| 6,038,452 A | 3/2000 | Strawczynski et al. |
| 6,041,039 A | 3/2000 | Kilkki et al. |
| 6,041,051 A | 3/2000 | Doshi et al. |
| 6,044,081 A | 3/2000 | Bell et al. |
| 6,046,980 A | 4/2000 | Packer |
| 6,046,985 A | 4/2000 | Aldred et al. |
| 6,047,000 A | 4/2000 | Tsang et al. |
| 6,047,322 A | 4/2000 | Vaid et al. |
| 6,047,325 A | 4/2000 | Jain et al. |
| 6,049,531 A | 4/2000 | Roy |
| 6,049,593 A | 4/2000 | Acampora |
| 6,052,375 A | 4/2000 | Bass et al. |
| 6,055,242 A | 4/2000 | Doshi et al. |
| 6,055,561 A | 4/2000 | Feldman et al. |
| 6,055,571 A | 4/2000 | Fulp et al. |

(56) References Cited

U.S. PATENT DOCUMENTS

| | | | |
|---|---|---|---|
| 6,058,114 A | 5/2000 | Sethuram et al. |
| 6,061,820 A | 5/2000 | Nakakita et al. |
| 6,064,649 A | 5/2000 | Johnston |
| 6,064,650 A | 5/2000 | Kappler et al. |
| 6,064,651 A | 5/2000 | Rogers et al. |
| 6,064,677 A | 5/2000 | Kappler et al. |
| 6,067,290 A | 5/2000 | Paulraj et al. |
| 6,069,889 A | 5/2000 | Feldman et al. |
| 6,072,773 A | 6/2000 | Fichou et al. |
| 6,075,787 A | 6/2000 | Bobeck et al. |
| 6,075,791 A | 6/2000 | Chiussi et al. |
| 6,078,953 A | 6/2000 | Vaid et al. |
| 6,081,507 A | 6/2000 | Chao et al. |
| 6,081,513 A | 6/2000 | Roy |
| 6,081,518 A | 6/2000 | Bowman-Amuah |
| 6,081,522 A | 6/2000 | Hendel et al. |
| 6,081,524 A | 6/2000 | Chase et al. |
| 6,081,843 A | 6/2000 | Kilkki et al. |
| 6,084,880 A | 7/2000 | Bailey et al. |
| 6,085,221 A | 7/2000 | Graf |
| 6,085,238 A | 7/2000 | Yuasa et al. |
| 6,085,252 A | 7/2000 | Zhu et al. |
| 6,088,356 A | 7/2000 | Hendel et al. |
| 6,088,368 A | 7/2000 | Rubinstain et al. |
| 6,088,622 A | 7/2000 | Dollin et al. |
| 6,088,732 A | 7/2000 | Smith et al. |
| 6,092,113 A | 7/2000 | Maeshima et al. |
| 6,094,435 A | 7/2000 | Hoffman et al. |
| 6,094,687 A | 7/2000 | Drake, Jr. et al. |
| 6,097,722 A | 8/2000 | Graham et al. |
| 6,101,180 A | 8/2000 | Donahue et al. |
| 6,101,181 A | 8/2000 | Passint et al. |
| 6,104,696 A | 8/2000 | Kadambi et al. |
| 6,104,700 A | 8/2000 | Haddock et al. |
| 6,104,712 A | 8/2000 | Robert et al. |
| 6,104,998 A | 8/2000 | Galand et al. |
| 6,108,314 A | 8/2000 | Jones et al. |
| 6,108,369 A | 8/2000 | Ovesjo et al. |
| 6,108,703 A | 8/2000 | Leighton et al. |
| 6,112,236 A | 8/2000 | Dollin et al. |
| 6,112,239 A | 8/2000 | Kenner et al. |
| 6,115,370 A | 9/2000 | Struhsaker et al. |
| 6,115,372 A | 9/2000 | Dinha |
| 6,115,378 A | 9/2000 | Hendel et al. |
| 6,115,390 A | 9/2000 | Chuah |
| 6,115,392 A | 9/2000 | Nomura |
| 6,115,751 A | 9/2000 | Tam et al. |
| 6,119,235 A | 9/2000 | Vaid et al. |
| 6,128,649 A | 10/2000 | Smith et al. |
| 6,130,889 A | 10/2000 | Feldman et al. |
| 6,131,012 A | 10/2000 | Struhsaker et al. |
| 6,134,217 A | 10/2000 | Stiliadis et al. |
| 6,137,777 A | 10/2000 | Vaid et al. |
| 6,137,787 A | 10/2000 | Chawla et al. |
| 6,137,793 A | 10/2000 | Gorman et al. |
| 6,141,319 A | 10/2000 | Dighe et al. |
| 6,141,686 A | 10/2000 | Jackowski et al. |
| 6,144,645 A | 11/2000 | Struhsaker et al. |
| 6,144,661 A | 11/2000 | Katsube et al. |
| 6,147,975 A | 11/2000 | Bowman-Amuah |
| 6,148,000 A | 11/2000 | Feldman et al. |
| 6,148,001 A | 11/2000 | Soirinsuo et al. |
| 6,148,005 A | 11/2000 | Paul et al. |
| 6,154,446 A | 11/2000 | Kadambi et al. |
| 6,157,648 A | 12/2000 | Voit et al. |
| 6,157,675 A | 12/2000 | Mitsuhashi et al. |
| 6,160,793 A | 12/2000 | Ghani et al. |
| 6,161,133 A | 12/2000 | Kikinis |
| 6,167,030 A | 12/2000 | Kilkki et al. |
| 6,167,445 A | 12/2000 | Gai et al. |
| 6,173,399 B1 | 1/2001 | Gilbrech |
| 6,175,870 B1 | 1/2001 | Gawlick et al. |
| 6,178,505 B1 | 1/2001 | Schneider et al. |
| 6,182,193 B1 | 1/2001 | Hamami |
| 6,185,221 B1 | 2/2001 | Aybay |
| 6,188,671 B1 | 2/2001 | Chase et al. |
| 6,188,698 B1 | 2/2001 | Galand et al. |
| 6,189,033 B1 | 2/2001 | Jin et al. |
| 6,195,355 B1 | 2/2001 | Demizu |
| 6,195,697 B1 | 2/2001 | Bowman-Amuah |
| 6,201,971 B1 | 3/2001 | Purnadi et al. |
| 6,202,082 B1 | 3/2001 | Tomizawa et al. |
| 6,205,150 B1 | 3/2001 | Ruszczyk |
| 6,205,211 B1 | 3/2001 | Thomas et al. |
| 6,205,488 B1 | 3/2001 | Casey et al. |
| 6,212,184 B1 | 4/2001 | Venkatachary et al. |
| 6,215,789 B1 | 4/2001 | Keenan et al. |
| 6,215,855 B1 | 4/2001 | Schneider |
| 6,223,222 B1 | 4/2001 | Fijolek et al. |
| 6,226,686 B1 | 5/2001 | Rothschild et al. |
| 6,226,748 B1 | 5/2001 | Bots et al. |
| 6,230,144 B1 | 5/2001 | Kilkki et al. |
| 6,230,203 B1 | 5/2001 | Koperda et al. |
| 6,230,252 B1 | 5/2001 | Passint et al. |
| 6,233,226 B1 | 5/2001 | Gringeri et al. |
| 6,240,462 B1 | 5/2001 | Agraharam et al. |
| 6,240,463 B1 | 5/2001 | Benmohamed et al. |
| 6,252,857 B1 | 6/2001 | Fendick et al. |
| 6,256,309 B1 | 7/2001 | Daley et al. |
| 6,256,310 B1 | 7/2001 | Kim et al. |
| 6,259,677 B1 | 7/2001 | Jain |
| 6,259,695 B1 | 7/2001 | Ofek |
| 6,259,699 B1 | 7/2001 | Opalka et al. |
| 6,262,976 B1 | 7/2001 | McNamara |
| 6,262,980 B1 | 7/2001 | Leung et al. |
| 6,262,982 B1 | 7/2001 | Donahue et al. |
| 6,266,339 B1 | 7/2001 | Donahue et al. |
| 6,272,151 B1 | 8/2001 | Gupta et al. |
| 6,275,470 B1 | 8/2001 | Ricciulli |
| 6,275,493 B1 | 8/2001 | Morris et al. |
| 6,275,695 B1 | 8/2001 | Obhan |
| 6,278,693 B1 | 8/2001 | Aldred et al. |
| 6,282,172 B1 | 8/2001 | Robles et al. |
| 6,286,031 B1 | 9/2001 | Waese et al. |
| 6,286,052 B1 | 9/2001 | McCloghrie et al. |
| 6,289,382 B1 | 9/2001 | Bowman-Amuah |
| 6,292,465 B1 | 9/2001 | Vaid et al. |
| 6,295,532 B1 | 9/2001 | Hawkinson |
| 6,301,244 B1 | 10/2001 | Huang et al. |
| 6,304,549 B1 | 10/2001 | Srinivasan et al. |
| 6,304,576 B1 | 10/2001 | Corley et al. |
| 6,310,862 B1 | 10/2001 | Roy |
| 6,310,881 B1 | 10/2001 | Zikan et al. |
| 6,310,941 B1 | 10/2001 | Crutcher et al. |
| 6,314,163 B1 | 11/2001 | Acampora |
| 6,317,438 B1 | 11/2001 | Trebes, Jr. |
| 6,317,584 B1 | 11/2001 | Abu-Amara et al. |
| 6,320,865 B1 | 11/2001 | Agrawala et al. |
| 6,324,166 B1 | 11/2001 | Yokoyama et al. |
| 6,324,169 B1 | 11/2001 | Roy |
| 6,330,586 B1 | 12/2001 | Yates et al. |
| 6,331,983 B1 | 12/2001 | Haggerty et al. |
| 6,331,985 B1 | 12/2001 | Coden |
| 6,331,987 B1 | 12/2001 | Beser |
| 6,332,163 B1 | 12/2001 | Bowman-Amuah |
| 6,334,219 B1 | 12/2001 | Hill et al. |
| 6,335,927 B1 | 1/2002 | Elliott et al. |
| 6,335,932 B2 | 1/2002 | Kadambi et al. |
| 6,335,935 B2 | 1/2002 | Kadambi et al. |
| 6,337,850 B1 | 1/2002 | Nakano et al. |
| 6,338,046 B1 | 1/2002 | Saari et al. |
| 6,339,832 B1 | 1/2002 | Bowman-Amuah |
| 6,341,130 B1 | 1/2002 | Lakshman et al. |
| 6,341,309 B1 | 1/2002 | Vaid et al. |
| 6,343,322 B2 | 1/2002 | Nagami et al. |
| 6,343,326 B2 | 1/2002 | Acharya et al. |
| 6,345,051 B1 | 2/2002 | Gupta et al. |
| 6,345,239 B1 | 2/2002 | Bowman-Amuah |
| 6,349,089 B1 | 2/2002 | Bonomi et al. |
| 6,351,456 B1 | 2/2002 | Struhsaker et al. |
| 6,351,773 B1 | 2/2002 | Fijolek et al. |
| 6,353,616 B1 | 3/2002 | Elwalid et al. |
| 6,356,546 B1 | 3/2002 | Beshai |
| 6,359,882 B1 | 3/2002 | Robles et al. |

(56) References Cited

U.S. PATENT DOCUMENTS

| | | |
|---|---|---|
| 6,359,901 B1 | 3/2002 | Todd et al. |
| 6,363,053 B1 | 3/2002 | Schuster et al. |
| 6,363,319 B1 | 3/2002 | Hsu |
| 6,363,411 B1 | 3/2002 | Dugan et al. |
| 6,366,577 B1 | 4/2002 | Donovan |
| 6,366,780 B1 | 4/2002 | Obhan |
| 6,366,959 B1 | 4/2002 | Sidhu et al. |
| 6,370,144 B1 | 4/2002 | Chao et al. |
| 6,370,520 B1 | 4/2002 | Ruutu et al. |
| 6,374,112 B1 | 4/2002 | Widegren et al. |
| 6,377,546 B1 | 4/2002 | Guerin et al. |
| 6,377,551 B1 | 4/2002 | Luo et al. |
| 6,377,573 B1 | 4/2002 | Shaffer et al. |
| 6,377,579 B1 | 4/2002 | Ofek |
| 6,377,583 B1 | 4/2002 | Lyles et al. |
| 6,377,931 B1 | 4/2002 | Shlomot |
| 6,385,169 B1 | 5/2002 | Wang |
| 6,385,198 B1 | 5/2002 | Ofek et al. |
| 6,385,204 B1 | 5/2002 | Hoefelmeyer et al. |
| 6,385,451 B1 | 5/2002 | Kalliokulju et al. |
| 6,385,615 B1 | 5/2002 | Haeri et al. |
| 6,389,031 B1 | 5/2002 | Chao et al. |
| 6,393,481 B1 | 5/2002 | Deo et al. |
| 6,396,834 B1 | 5/2002 | Bonomi et al. |
| 6,396,837 B1 | 5/2002 | Wang et al. |
| 6,397,251 B1 | 5/2002 | Graf |
| 6,400,681 B1 | 6/2002 | Bertin et al. |
| 6,400,819 B1 | 6/2002 | Nakano et al. |
| 6,404,735 B1 | 6/2002 | Beshai et al. |
| 6,404,861 B1 | 6/2002 | Cohen et al. |
| 6,405,257 B1 | 6/2002 | Gersht et al. |
| 6,407,998 B1 | 6/2002 | Polit et al. |
| 6,408,001 B1 | 6/2002 | Chuah et al. |
| 6,411,616 B1 | 6/2002 | Donahue et al. |
| 6,411,946 B1 | 6/2002 | Chaudhuri |
| 6,414,952 B2 | 7/2002 | Foley |
| 6,415,313 B1 | 7/2002 | Yamada et al. |
| 6,418,169 B1 | 7/2002 | Datari |
| 6,421,335 B1 | 7/2002 | Kilkki et al. |
| 6,421,726 B1 | 7/2002 | Kenner et al. |
| 6,424,659 B2 | 7/2002 | Viswanadham et al. |
| 6,426,945 B1 | 7/2002 | Sengodan |
| 6,426,948 B1 | 7/2002 | Bowman-Amuah |
| 6,426,955 B1 | 7/2002 | Gossett Dalton, Jr. et al. |
| 6,427,132 B1 | 7/2002 | Bowman-Amuah |
| 6,427,174 B1 | 7/2002 | Sitaraman et al. |
| 6,430,152 B1 | 8/2002 | Jones et al. |
| 6,430,167 B1 | 8/2002 | Falk |
| 6,434,129 B1 | 8/2002 | Struhsaker et al. |
| 6,434,134 B1 | 8/2002 | La Porta et al. |
| 6,434,152 B1 | 8/2002 | Yamamura |
| 6,434,154 B1 | 8/2002 | Stacey et al. |
| 6,434,568 B1 | 8/2002 | Bowman-Amuah |
| 6,434,612 B1 | 8/2002 | Hughes et al. |
| 6,434,628 B1 | 8/2002 | Bowman-Amuah |
| 6,438,104 B1 | 8/2002 | Fodor et al. |
| 6,438,106 B1 | 8/2002 | Pillar et al. |
| 6,438,594 B1 | 8/2002 | Bowman-Amuah |
| 6,442,135 B1 | 8/2002 | Ofek |
| 6,442,140 B1 | 8/2002 | Kirschenbaum |
| 6,442,158 B1 | 8/2002 | Beser |
| 6,442,164 B1 | 8/2002 | Wu |
| 6,442,547 B1 | 8/2002 | Bowman-Amuah |
| 6,442,748 B1 | 8/2002 | Bowman-Amuah |
| 6,446,125 B1 | 9/2002 | Huang et al. |
| 6,446,126 B1 | 9/2002 | Huang et al. |
| 6,449,265 B1 | 9/2002 | Prieto, Jr. |
| 6,449,267 B1 | 9/2002 | Connors |
| 6,449,283 B1 | 9/2002 | Chao et al. |
| 6,449,588 B1 | 9/2002 | Bowman-Amuah |
| 6,449,647 B1 | 9/2002 | Colby et al. |
| 6,452,915 B1 | 9/2002 | Jorgensen |
| 6,452,942 B1 | 9/2002 | Lemieux |
| 6,456,631 B1 | 9/2002 | Nomura |
| 6,459,697 B1 | 10/2002 | Neyman |
| 6,463,454 B1 | 10/2002 | Lumelsky et al. |
| 6,466,574 B1 | 10/2002 | Fujisaki et al. |
| 6,466,980 B1 | 10/2002 | Lumelsky et al. |
| 6,473,794 B1 | 10/2002 | Guheen et al. |
| 6,473,858 B1 | 10/2002 | Shimomura et al. |
| 6,477,147 B1 | 11/2002 | Bocking et al. |
| 6,477,167 B1 | 11/2002 | Wu |
| 6,477,580 B1 | 11/2002 | Bowman-Amuah |
| 6,477,582 B1 | 11/2002 | Luo et al. |
| 6,477,595 B1 | 11/2002 | Cohen et al. |
| 6,477,665 B1 | 11/2002 | Bowman-Amuah |
| 6,480,495 B1 | 11/2002 | Mauger et al. |
| 6,480,541 B1 | 11/2002 | Girod et al. |
| 6,480,898 B1 | 11/2002 | Scott et al. |
| 6,480,899 B1 | 11/2002 | Seddigh et al. |
| 6,483,805 B1 | 11/2002 | Davies et al. |
| 6,483,842 B1 | 11/2002 | Mauger |
| 6,483,912 B1 | 11/2002 | Kalmanek, Jr. et al. |
| 6,487,167 B1 | 11/2002 | Shaio |
| 6,487,170 B1 | 11/2002 | Chen et al. |
| 6,487,213 B1 | 11/2002 | Chao |
| 6,490,249 B1 | 12/2002 | Aboul-Magd et al. |
| 6,490,256 B1 | 12/2002 | Jones et al. |
| 6,490,275 B1 | 12/2002 | Sengodan |
| 6,490,629 B1 | 12/2002 | Milliken et al. |
| 6,493,317 B1 | 12/2002 | Ma |
| 6,493,331 B1 | 12/2002 | Walton et al. |
| 6,493,342 B1 | 12/2002 | Breslow et al. |
| 6,493,348 B1 | 12/2002 | Gelman et al. |
| 6,496,477 B1 | 12/2002 | Perkins et al. |
| 6,496,505 B2 | 12/2002 | La Porta et al. |
| 6,496,850 B1 | 12/2002 | Bowman-Amuah |
| 6,498,782 B1 | 12/2002 | Branstad et al. |
| 6,498,865 B1 | 12/2002 | Brailean et al. |
| 6,502,131 B1 | 12/2002 | Vaid et al. |
| 6,502,135 B1 | 12/2002 | Munger et al. |
| 6,502,213 B1 | 12/2002 | Bowman-Amuah |
| 6,505,244 B1 | 1/2003 | Natarajan et al. |
| 6,510,162 B1 | 1/2003 | Fijolek et al. |
| 6,510,509 B1 | 1/2003 | Chopra et al. |
| 6,512,751 B1 | 1/2003 | Struhsaker et al. |
| 6,512,821 B1 | 1/2003 | Johnstone et al. |
| 6,515,963 B1 | 2/2003 | Bechtolsheim et al. |
| 6,516,350 B1 | 2/2003 | Lumelsky et al. |
| 6,519,254 B1 | 2/2003 | Chuah et al. |
| 6,519,263 B1 | 2/2003 | Huth |
| 6,519,571 B1 | 2/2003 | Guheen et al. |
| 6,519,595 B1 | 2/2003 | Rose |
| 6,519,636 B2 | 2/2003 | Engel et al. |
| 6,522,627 B1 | 2/2003 | Mauger |
| 6,523,696 B1 | 2/2003 | Saito et al. |
| 6,526,062 B1 | 2/2003 | Milliken et al. |
| 6,529,498 B1 | 3/2003 | Cheng |
| 6,529,508 B1 | 3/2003 | Li et al. |
| 6,529,909 B1 | 3/2003 | Bowman-Amuah |
| 6,529,948 B1 | 3/2003 | Bowman-Amuah |
| 6,529,950 B1 | 3/2003 | Lumelsky et al. |
| 6,532,213 B1 | 3/2003 | Chiussi et al. |
| 6,535,505 B1 | 3/2003 | Hwang et al. |
| 6,535,922 B1 | 3/2003 | Kikinis |
| 6,536,037 B1 | 3/2003 | Guheen et al. |
| 6,538,416 B1 | 3/2003 | Hahne et al. |
| 6,538,989 B1 | 3/2003 | Carter et al. |
| 6,539,011 B1 | 3/2003 | Keenan et al. |
| 6,539,026 B1 | 3/2003 | Waclawsky |
| 6,539,237 B1 | 3/2003 | Sayers et al. |
| 6,539,396 B1 | 3/2003 | Bowman-Amuah |
| 6,539,427 B1 | 3/2003 | Natarajan et al. |
| 6,539,431 B1 | 3/2003 | Sitaraman et al. |
| 6,542,465 B1 | 4/2003 | Wang |
| 6,542,500 B1 | 4/2003 | Gerszberg et al. |
| 6,542,511 B1 | 4/2003 | Livermore et al. |
| 6,542,593 B1 | 4/2003 | Bowman-Amuah |
| 6,546,017 B1 | 4/2003 | Khaunte |
| 6,549,514 B1 | 4/2003 | Kilkki et al. |
| 6,549,539 B1 | 4/2003 | Neyman |
| 6,549,938 B1 | 4/2003 | Kilkki et al. |
| 6,549,949 B1 | 4/2003 | Bowman-Amuah |
| 6,550,057 B1 | 4/2003 | Bowman-Amuah |

(56) References Cited

U.S. PATENT DOCUMENTS

| | | |
|---|---|---|
| 6,553,376 B1 | 4/2003 | Lewis et al. |
| 6,553,410 B2 | 4/2003 | Kikinis |
| 6,553,413 B1 | 4/2003 | Leighton et al. |
| 6,553,515 B1 | 4/2003 | Gross et al. |
| 6,553,568 B1 | 4/2003 | Fijolek et al. |
| 6,556,586 B1 | 4/2003 | Sipila |
| 6,556,659 B1 | 4/2003 | Bowman-Amuah |
| 6,556,824 B1 | 4/2003 | Purnadi et al. |
| 6,557,037 B1 | 4/2003 | Provino |
| 6,560,196 B1 | 5/2003 | Wei |
| 6,560,225 B1 | 5/2003 | Czajkowski et al. |
| 6,560,229 B1 | 5/2003 | Kadambi et al. |
| 6,560,230 B1 | 5/2003 | Li et al. |
| 6,560,654 B1 | 5/2003 | Fedyk et al. |
| 6,563,793 B1 | 5/2003 | Golden et al. |
| 6,563,794 B1 | 5/2003 | Takashima et al. |
| 6,563,829 B1 | 5/2003 | Lyles et al. |
| 6,564,209 B1 | 5/2003 | Dempski et al. |
| 6,567,406 B1 | 5/2003 | Skemer |
| 6,567,408 B1 | 5/2003 | Li et al. |
| 6,567,415 B1 | 5/2003 | Elwalid et al. |
| 6,570,849 B1 | 5/2003 | Skemer et al. |
| 6,570,875 B1 | 5/2003 | Hegde |
| 6,570,879 B1 | 5/2003 | Kikuchi |
| 6,570,890 B1 | 5/2003 | Keenan et al. |
| 6,571,282 B1 | 5/2003 | Bowman-Amuah |
| 6,571,285 B1 | 5/2003 | Groath et al. |
| 6,574,195 B2 | 6/2003 | Roberts |
| 6,574,213 B1 | 6/2003 | Anandakumar et al. |
| 6,574,218 B1 | 6/2003 | Cooklev |
| 6,574,221 B1 | 6/2003 | Petersen |
| 6,574,224 B1 | 6/2003 | Brueckheimer et al. |
| 6,574,242 B1 | 6/2003 | Keenan et al. |
| 6,574,335 B1 | 6/2003 | Kalmanek, Jr. et al. |
| 6,577,595 B1 | 6/2003 | Counterman |
| 6,577,597 B1 | 6/2003 | Natarajan et al. |
| 6,577,631 B1 | 6/2003 | Keenan et al. |
| 6,577,642 B1 | 6/2003 | Fijolek et al. |
| 6,577,718 B1 | 6/2003 | Kalmanek, Jr. et al. |
| 6,578,068 B1 | 6/2003 | Bowman-Amuah |
| 6,578,077 B1 | 6/2003 | Rakoshitz et al. |
| 6,580,721 B1 | 6/2003 | Beshai |
| 6,581,102 B1 | 6/2003 | Amini et al. |
| 6,584,080 B1 | 6/2003 | Ganz et al. |
| 6,584,093 B1 | 6/2003 | Salama et al. |
| 6,584,108 B1 | 6/2003 | Chung et al. |
| 6,584,122 B1 | 6/2003 | Matthews et al. |
| 6,584,228 B1 | 6/2003 | Wu |
| 6,584,493 B1 | 6/2003 | Butler |
| 6,584,502 B1 | 6/2003 | Natarajan et al. |
| 6,584,509 B2 | 6/2003 | Putzolu |
| 6,587,431 B1 | 7/2003 | Almulhem et al. |
| 6,587,460 B1 | 7/2003 | Bell et al. |
| 6,587,476 B1 | 7/2003 | Lewin et al. |
| 6,587,480 B1 | 7/2003 | Higgins et al. |
| 6,590,867 B1 | 7/2003 | Ash et al. |
| 6,590,885 B1 | 7/2003 | Jorgensen |
| 6,591,301 B1 | 7/2003 | Li et al. |
| 6,594,246 B1 | 7/2003 | Jorgensen |
| 6,594,268 B1 | 7/2003 | Aukia et al. |
| 6,594,277 B1 | 7/2003 | Chiang et al. |
| 6,594,279 B1 | 7/2003 | Nguyen et al. |
| 6,594,699 B1 | 7/2003 | Sahai et al. |
| 6,597,684 B1 | 7/2003 | Gulati et al. |
| 6,597,689 B1 | 7/2003 | Chiu et al. |
| 6,598,034 B1 | 7/2003 | Kloth |
| 6,598,080 B1 | 7/2003 | Nagami et al. |
| 6,600,720 B1 | 7/2003 | Gvozdanovic |
| 6,600,741 B1 | 7/2003 | Chrin et al. |
| 6,600,752 B1 | 7/2003 | Duong-Van |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,608,815 B1 | 8/2003 | Huang et al. |
| 6,608,832 B2 | 8/2003 | Forslow |
| 6,608,834 B1 | 8/2003 | Lewin et al. |
| 6,609,002 B1 | 8/2003 | Krishnamurthy et al. |
| 6,611,519 B1 | 8/2003 | Howe |
| 6,611,522 B1 | 8/2003 | Zheng et al. |
| 6,611,526 B1 | 8/2003 | Chinnaswamy et al. |
| 6,611,531 B1 | 8/2003 | Chen et al. |
| 6,611,822 B1 | 8/2003 | Beams et al. |
| 6,611,867 B1 | 8/2003 | Bowman-Amuah |
| 6,611,875 B1 | 8/2003 | Chopra et al. |
| 6,611,886 B1 | 8/2003 | Lee et al. |
| 6,614,781 B1 | 9/2003 | Elliott et al. |
| 6,614,936 B1 | 9/2003 | Wu et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,356 B1 | 9/2003 | Bonaventure |
| 6,621,833 B1 | 9/2003 | Pierson, Jr. |
| 6,628,609 B2 | 9/2003 | Chapman et al. |
| 6,628,610 B1 | 9/2003 | Waclawsky et al. |
| 6,628,629 B1 | 9/2003 | Jorgensen |
| 6,628,666 B1 | 9/2003 | Pickering et al. |
| 6,631,122 B1 | 10/2003 | Arunachalam et al. |
| 6,631,135 B1 | 10/2003 | Wojcik |
| 6,633,544 B1 | 10/2003 | Rexford et al. |
| 6,633,569 B2 | 10/2003 | Hemmady |
| 6,633,585 B1 | 10/2003 | Ghanwani et al. |
| 6,636,242 B2 | 10/2003 | Bowman-Amuah |
| 6,636,485 B1 | 10/2003 | Fijolek et al. |
| 6,636,505 B1 | 10/2003 | Wang et al. |
| 6,636,509 B1 | 10/2003 | Hughes |
| 6,640,238 B1 | 10/2003 | Bowman-Amuah |
| 6,640,239 B1 | 10/2003 | Gidwani |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,643,259 B1 | 11/2003 | Borella et al. |
| 6,646,988 B1 | 11/2003 | Nandy et al. |
| 6,646,999 B1 | 11/2003 | Kato et al. |
| 6,650,639 B2 | 11/2003 | Doherty et al. |
| 6,650,649 B1 | 11/2003 | Muhammad et al. |
| 6,654,346 B1 | 11/2003 | Mahalingaiah et al. |
| 6,654,359 B1 | 11/2003 | La Porta et al. |
| 6,654,363 B1 | 11/2003 | Li et al. |
| 6,654,373 B1 | 11/2003 | Maher, III et al. |
| 6,654,808 B1 | 11/2003 | Chuah |
| 6,657,960 B1 | 12/2003 | Jeffries et al. |
| 6,658,002 B1 | 12/2003 | Ross et al. |
| 6,658,568 B1 | 12/2003 | Ginter et al. |
| 6,661,775 B1 | 12/2003 | Nakayama et al. |
| 6,662,221 B1 | 12/2003 | Gonda et al. |
| 6,665,301 B1 | 12/2003 | Wu |
| 6,667,956 B2 | 12/2003 | Beshai et al. |
| 6,667,984 B1 | 12/2003 | Chao et al. |
| 6,671,262 B1 | 12/2003 | Kung et al. |
| 6,671,818 B1 | 12/2003 | Mikurak |
| 6,674,477 B1 | 1/2004 | Yamaguchi et al. |
| 6,674,717 B1 | 1/2004 | Duong-van et al. |
| 6,674,744 B1 | 1/2004 | Doshi et al. |
| 6,674,754 B1 | 1/2004 | Ofek |
| 6,674,760 B1 | 1/2004 | Walrand et al. |
| 6,675,229 B1 | 1/2004 | Bruno et al. |
| 6,678,248 B1 | 1/2004 | Haddock et al. |
| 6,678,252 B1 | 1/2004 | Cansever |
| 6,678,253 B1 | 1/2004 | Heath, Jr. et al. |
| 6,678,264 B1 | 1/2004 | Gibson |
| 6,678,267 B1 | 1/2004 | Anandakumar et al. |
| 6,680,906 B1 | 1/2004 | Nguyen |
| 6,680,922 B1 | 1/2004 | Jorgensen |
| 6,680,940 B1 | 1/2004 | Lewin et al. |
| 6,680,948 B1 | 1/2004 | Majd et al. |
| 6,680,976 B1 | 1/2004 | Chen et al. |
| 6,683,866 B1 | 1/2004 | Stanwood et al. |
| 6,683,869 B1 | 1/2004 | Pierson, Jr. |
| 6,687,735 B1 | 2/2004 | Logston et al. |
| 6,690,646 B1 | 2/2004 | Fichou et al. |
| 6,690,647 B1 | 2/2004 | Tang et al. |
| 6,690,659 B1 | 2/2004 | Ahmed et al. |
| 6,690,929 B1 | 2/2004 | Yeh |

(56) References Cited

U.S. PATENT DOCUMENTS

| | | |
|---|---|---|
| 6,693,896 B1 | 2/2004 | Utsumi et al. |
| 6,693,909 B1 | 2/2004 | Mo et al. |
| 6,693,912 B1 | 2/2004 | Wang |
| 6,697,334 B1 | 2/2004 | Klincewicz et al. |
| 6,697,342 B1 | 2/2004 | Smyth et al. |
| 6,697,345 B1 | 2/2004 | Corrigan, III et al. |
| 6,700,893 B1 | 3/2004 | Radha et al. |
| 6,700,895 B1 | 3/2004 | Kroll |
| 6,700,933 B1 | 3/2004 | Wu et al. |
| 6,701,342 B1 | 3/2004 | Bartz et al. |
| 6,704,288 B1 | 3/2004 | Dziekan et al. |
| 6,704,303 B1 | 3/2004 | Bowman-Amuah |
| 6,704,409 B1 | 3/2004 | Dilip et al. |
| 6,707,790 B1 | 3/2004 | Wu et al. |
| 6,707,812 B1 | 3/2004 | Bowman-Amuah |
| 6,707,817 B1 | 3/2004 | Kadambi et al. |
| 6,707,818 B1 | 3/2004 | Kadambi et al. |
| 6,707,820 B1 | 3/2004 | Arndt et al. |
| 6,708,209 B1 | 3/2004 | Ebata et al. |
| 6,711,135 B1 | 3/2004 | Dziekan et al. |
| 6,711,141 B1 | 3/2004 | Rinne et al. |
| 6,711,152 B1 | 3/2004 | Kalmanek, Jr. et al. |
| 6,711,180 B1 | 3/2004 | Delesalle et al. |
| 6,711,611 B2 | 3/2004 | Hanhan |
| 6,714,517 B1 | 3/2004 | Fawaz et al. |
| 6,714,549 B1 | 3/2004 | Phaltankar |
| 6,714,987 B1 | 3/2004 | Amin et al. |
| 6,715,145 B1 | 3/2004 | Bowman-Amuah |
| 6,717,947 B1 | 4/2004 | Ghodrat et al. |
| 6,721,270 B1 | 4/2004 | Mitra et al. |
| 6,721,290 B1 | 4/2004 | Kondylis et al. |
| 6,721,355 B1 | 4/2004 | McClennon et al. |
| 6,721,713 B1 | 4/2004 | Guheen et al. |
| 6,721,726 B1 | 4/2004 | Swaminathan et al. |
| 6,721,786 B1 | 4/2004 | Gordon et al. |
| 6,727,927 B1 | 4/2004 | Dempski et al. |
| 6,728,365 B1 | 4/2004 | Li et al. |
| 6,728,748 B1 | 4/2004 | Mangipudi et al. |
| 6,728,887 B1 | 4/2004 | Dziekan et al. |
| 6,731,625 B1 | 5/2004 | Eastep et al. |
| 6,731,626 B1 | 5/2004 | Neyman |
| 6,735,190 B1 | 5/2004 | Chuah et al. |
| 6,735,199 B1 | 5/2004 | Ofek |
| 6,735,202 B1 | 5/2004 | Ahmed et al. |
| 6,735,208 B1 | 5/2004 | Riemann et al. |
| 6,735,214 B1 | 5/2004 | Uzun |
| 6,735,633 B1 | 5/2004 | Welch et al. |
| 6,735,679 B1 | 5/2004 | Herbst et al. |
| 6,741,552 B1 | 5/2004 | McCrosky et al. |
| 6,741,575 B1 | 5/2004 | Zhang et al. |
| 6,742,015 B1 | 5/2004 | Bowman-Amuah |
| 6,744,757 B1 | 6/2004 | Anandakumar et al. |
| 6,744,767 B1 | 6/2004 | Chiu et al. |
| 6,747,968 B1 | 6/2004 | Seppala |
| 6,747,977 B1 | 6/2004 | Smith et al. |
| 6,747,986 B1 | 6/2004 | Charas et al. |
| 6,748,433 B1 | 6/2004 | Yaakov |
| 6,751,214 B1 | 6/2004 | Parruck et al. |
| 6,751,221 B1 | 6/2004 | Saito et al. |
| 6,751,666 B1 | 6/2004 | Huang et al. |
| 6,754,177 B1 | 6/2004 | Gersht et al. |
| 6,754,181 B1 | 6/2004 | Elliott et al. |
| 6,754,206 B1 | 6/2004 | Nattkemper et al. |
| 6,754,210 B1 | 6/2004 | Ofek |
| 6,754,214 B1 | 6/2004 | Mahalingaiah |
| 6,754,696 B1 | 6/2004 | Kamath et al. |
| 6,757,256 B1 | 6/2004 | Anandakumar et al. |
| 6,757,265 B1 | 6/2004 | Sebastian et al. |
| 6,757,268 B1 | 6/2004 | Zendle |
| 6,757,282 B1 | 6/2004 | Ofek |
| 6,760,309 B1 | 7/2004 | Rochberger et al. |
| 6,760,312 B1 | 7/2004 | Hitzeman |
| 6,762,997 B1 | 7/2004 | Liu et al. |
| 6,763,000 B1 | 7/2004 | Walsh |
| 6,763,017 B1 | 7/2004 | Buckingham et al. |
| 6,765,864 B1 | 7/2004 | Natarajan et al. |
| 6,765,872 B1 | 7/2004 | Tazaki |
| 6,765,873 B1 | 7/2004 | Fichou et al. |
| 6,765,896 B1 | 7/2004 | Ahmed et al. |
| 6,765,904 B1 | 7/2004 | Anandakumar et al. |
| 6,765,921 B1 | 7/2004 | Stacey et al. |
| 6,765,931 B1 | 7/2004 | Rabenko et al. |
| 6,766,365 B1 | 7/2004 | Huang et al. |
| 6,768,738 B1 | 7/2004 | Yazaki et al. |
| 6,768,744 B1 | 7/2004 | Kumaran et al. |
| 6,771,646 B1 | 8/2004 | Sarkissian et al. |
| 6,771,661 B1 | 8/2004 | Chawla et al. |
| 6,772,223 B1 | 8/2004 | Corl, Jr. et al. |
| 6,775,229 B1 | 8/2004 | Mo et al. |
| 6,775,267 B1 | 8/2004 | Kung et al. |
| 6,775,268 B1 | 8/2004 | Wang et al. |
| 6,775,301 B1 | 8/2004 | Kroll et al. |
| 6,778,493 B1 | 8/2004 | Ishii |
| 6,778,496 B1 | 8/2004 | Meempat et al. |
| 6,778,536 B1 | 8/2004 | Ofek et al. |
| 6,778,557 B1 | 8/2004 | Yuki et al. |
| 6,779,181 B1 | 8/2004 | Yu et al. |
| 6,781,956 B1 | 8/2004 | Cheung |
| 6,781,996 B1 | 8/2004 | Hemmady |
| 6,785,229 B1 | 8/2004 | McNiff et al. |
| 6,785,236 B1 | 8/2004 | Lo et al. |
| 6,788,646 B1 | 9/2004 | Fodor et al. |
| 6,788,649 B1 | 9/2004 | Dugan et al. |
| 6,788,681 B1 | 9/2004 | Hurren et al. |
| 6,791,949 B1 | 9/2004 | Ryu et al. |
| 6,792,472 B1 | 9/2004 | Otterness et al. |
| 6,792,500 B1 | 9/2004 | Herbst |
| 6,795,399 B1 | 9/2004 | Benmohamed et al. |
| 6,801,499 B1 | 10/2004 | Anandakumar et al. |
| 6,801,501 B1 | 10/2004 | Knightly et al. |
| 6,801,502 B1 | 10/2004 | Rexford et al. |
| 6,801,532 B1 | 10/2004 | Anandakumar et al. |
| 6,802,068 B1 | 10/2004 | Guruprasad |
| 6,804,244 B1 | 10/2004 | Anandakumar et al. |
| 6,804,717 B1 | 10/2004 | Bakshi et al. |
| 6,807,150 B1 | 10/2004 | McNiff et al. |
| 6,807,166 B1 | 10/2004 | Ohura |
| 6,807,185 B1 | 10/2004 | Bell et al. |
| 6,807,193 B1 | 10/2004 | Beser |
| 6,810,037 B1 | 10/2004 | Kalapathy et al. |
| 6,813,245 B1 | 11/2004 | Furuno |
| 6,813,259 B1 | 11/2004 | Kumar et al. |
| 6,813,268 B1 | 11/2004 | Kalkunte et al. |
| 6,816,456 B1 | 11/2004 | Tse-Au |
| 6,816,469 B1 | 11/2004 | Kung et al. |
| 6,816,903 B1 | 11/2004 | Rakoshitz et al. |
| 6,822,966 B2 | 11/2004 | Putcha et al. |
| 6,826,195 B1 | 11/2004 | Nikolich et al. |
| 6,829,221 B1 | 12/2004 | Winckles et al. |
| 6,829,254 B1 | 12/2004 | Rajahalme et al. |
| 6,829,654 B1 | 12/2004 | Jungck |
| 6,831,915 B1 | 12/2004 | Beyschlag et al. |
| 6,836,515 B1 | 12/2004 | Kay et al. |
| 6,842,780 B1 | 1/2005 | Frei et al. |
| 6,842,906 B1 | 1/2005 | Bowman-Amuah |
| 6,847,633 B1 | 1/2005 | Ryu et al. |
| 6,850,513 B1 | 2/2005 | Pelissier |
| 6,850,521 B1 | 2/2005 | Kadambi et al. |
| 6,856,676 B1 | 2/2005 | Pirot et al. |
| 6,859,460 B1 | 2/2005 | Chen |
| 6,862,622 B2 | 3/2005 | Jorgensen |
| 6,865,154 B1 | 3/2005 | Charny et al. |
| 6,865,170 B1 | 3/2005 | Zendle |
| 6,865,185 B1 | 3/2005 | Patel et al. |
| 6,876,627 B1 | 4/2005 | Rao |
| 6,876,655 B1 | 4/2005 | Afek et al. |
| 6,876,668 B1 | 4/2005 | Chawla et al. |
| 6,886,043 B1 | 4/2005 | Mauger et al. |
| 6,891,798 B1 | 5/2005 | Yip et al. |
| 6,891,834 B1 | 5/2005 | Dally et al. |
| 6,898,654 B1 | 5/2005 | Senior et al. |
| 6,900,807 B1 | 5/2005 | Liongosari et al. |
| 6,901,080 B1 | 5/2005 | Beyda et al. |
| 6,904,017 B1 | 6/2005 | Meempat et al. |

(56) References Cited

U.S. PATENT DOCUMENTS

| | | |
|---|---|---|
| 6,907,003 B1 | 6/2005 | Gvozdanovic |
| 6,907,036 B1 | 6/2005 | Malalur |
| 6,909,700 B1 | 6/2005 | Benmohamed et al. |
| 6,909,708 B1 | 6/2005 | Krishnaswamy et al. |
| 6,912,221 B1 | 6/2005 | Zadikian et al. |
| 6,912,222 B1 | 6/2005 | Wheeler et al. |
| 6,912,232 B1 | 6/2005 | Duffield et al. |
| 6,912,637 B1 | 6/2005 | Herbst |
| 6,917,614 B1 | 7/2005 | Laubach et al. |
| 6,918,034 B1 | 7/2005 | Sengodan et al. |
| 6,920,113 B1 | 7/2005 | Kovvali et al. |
| 6,925,054 B1 | 8/2005 | Atterton et al. |
| 6,930,984 B1 | 8/2005 | Nomura et al. |
| 6,934,258 B1 | 8/2005 | Smith et al. |
| 6,934,280 B1 | 8/2005 | Ho et al. |
| 6,937,566 B1 | 8/2005 | Forslow |
| 6,940,814 B1 | 9/2005 | Hoffman |
| 6,941,551 B1 | 9/2005 | Turkoglu |
| 6,944,169 B1 | 9/2005 | Yoshizawa et al. |
| 6,947,408 B1 | 9/2005 | Liberti et al. |
| 6,952,401 B1 | 10/2005 | Kadambi et al. |
| 6,957,186 B1 | 10/2005 | Guheen et al. |
| 6,965,868 B1 | 11/2005 | Bednarek |
| 6,965,948 B1 | 11/2005 | Eneborg et al. |
| 6,967,954 B2 | 11/2005 | Sugiyama |
| 6,970,424 B2 | 11/2005 | Fawaz et al. |
| 6,973,034 B1 | 12/2005 | Natarajan et al. |
| 6,973,037 B1 | 12/2005 | Kahveci |
| 6,975,594 B1 | 12/2005 | Byers |
| 6,975,609 B1 | 12/2005 | Khaleghi et al. |
| 6,977,896 B1 | 12/2005 | Kobayashi |
| 6,985,722 B1 | 1/2006 | Snelgrove et al. |
| 6,985,901 B1 | 1/2006 | Sachse et al. |
| 6,986,157 B1 | 1/2006 | Fijolek et al. |
| 6,993,027 B1 | 1/2006 | Kadambi et al. |
| 6,993,584 B2 | 1/2006 | Border et al. |
| 6,996,099 B1 | 2/2006 | Kadambi et al. |
| 6,996,630 B1 | 2/2006 | Masaki et al. |
| 7,002,918 B1 | 2/2006 | Prieto, Jr. et al. |
| 7,002,982 B1 | 2/2006 | Herbst |
| 7,006,435 B1 | 2/2006 | Davies et al. |
| 7,006,472 B1 | 2/2006 | Immonen et al. |
| 7,006,616 B1 | 2/2006 | Christofferson et al. |
| 7,009,962 B1 | 3/2006 | Chung et al. |
| 7,010,604 B1 | 3/2006 | Munger et al. |
| 7,012,919 B1 | 3/2006 | So et al. |
| 7,020,142 B2 | 3/2006 | Kodaira |
| 7,020,879 B1 | 3/2006 | Nemirovsky et al. |
| 7,028,088 B1 | 4/2006 | Koperda et al. |
| 7,031,302 B1 | 4/2006 | Malalur |
| 7,032,241 B1 | 4/2006 | Venkatachary et al. |
| 7,039,062 B1 | 5/2006 | Taddiken |
| 7,046,665 B1 | 5/2006 | Walrand et al. |
| 7,046,669 B1 | 5/2006 | Mauger et al. |
| 7,046,786 B2 | 5/2006 | Liesenberg |
| 7,047,279 B1 | 5/2006 | Beams et al. |
| 7,054,267 B2 | 5/2006 | Ramanan et al. |
| 7,058,027 B1 | 6/2006 | Alessi et al. |
| 7,058,704 B1 | 6/2006 | Mangipudi et al. |
| 7,058,721 B1 | 6/2006 | Ellison et al. |
| 7,058,974 B1 | 6/2006 | Maher, III et al. |
| 7,061,861 B1 | 6/2006 | Mekkittikul et al. |
| 7,065,050 B1 | 6/2006 | Herbst |
| 7,068,594 B1 | 6/2006 | Tasker |
| 7,068,641 B1 | 6/2006 | Allan et al. |
| 7,089,009 B1 | 8/2006 | Fauconnier |
| 7,095,760 B1 | 8/2006 | Parruck et al. |
| 7,099,276 B1 | 8/2006 | Kalkunte et al. |
| 7,103,667 B1 | 9/2006 | Bell et al. |
| 7,106,737 B1 | 9/2006 | Beyda et al. |
| 7,107,334 B1 | 9/2006 | Shaffer et al. |
| 7,111,205 B1 | 9/2006 | Jahn et al. |
| 7,113,484 B1 | 9/2006 | Chapman et al. |
| 7,120,139 B1 | 10/2006 | Kung et al. |
| 7,120,694 B2 | 10/2006 | Sinha |
| 7,123,620 B1 | 10/2006 | Ma |
| 7,124,101 B1 | 10/2006 | Mikurak |
| 7,130,807 B1 | 10/2006 | Mikurak |
| 7,133,403 B1 | 11/2006 | Mo et al. |
| 7,133,417 B1 | 11/2006 | Kao et al. |
| 7,133,846 B1 | 11/2006 | Ginter et al. |
| 7,136,062 B1 | 11/2006 | Butler |
| 7,136,377 B1 | 11/2006 | Tweedly et al. |
| 7,145,869 B1 | 12/2006 | Kadambi et al. |
| 7,145,898 B1 | 12/2006 | Elliott |
| 7,149,185 B1 | 12/2006 | Suni |
| 7,149,896 B1 | 12/2006 | Bahl et al. |
| 7,151,772 B1 | 12/2006 | Kalmanek, Jr. et al. |
| 7,165,041 B1 | 1/2007 | Guheen et al. |
| 7,165,174 B1 | 1/2007 | Ginter et al. |
| 7,177,323 B2 | 2/2007 | Yavatkar et al. |
| 7,181,526 B1 | 2/2007 | Bell et al. |
| 7,184,441 B1 | 2/2007 | Kadambi et al. |
| 7,197,044 B1 | 3/2007 | Kadambi et al. |
| 7,209,437 B1 | 4/2007 | Hodgkinson et al. |
| RE39,717 E | 7/2007 | Yates et al. |
| 7,239,607 B1 | 7/2007 | Vijeh et al. |
| 7,257,814 B1 | 8/2007 | Melvin et al. |
| 7,260,060 B1 | 8/2007 | Abaye et al. |
| 7,269,159 B1 | 9/2007 | Lai |
| 7,274,662 B1 | 9/2007 | Kalmanek, Jr. et al. |
| 7,280,991 B1 | 10/2007 | Beams et al. |
| 7,289,964 B1 | 10/2007 | Bowman-Amuah |
| 7,310,670 B1 | 12/2007 | Walbeck et al. |
| 7,313,533 B2 | 12/2007 | Chang et al. |
| 7,315,826 B1 | 1/2008 | Guheen et al. |
| 7,330,661 B1 | 2/2008 | Jackson et al. |
| 7,339,924 B1 | 3/2008 | Chung et al. |
| 7,346,063 B1 | 3/2008 | Herbst |
| 7,350,138 B1 | 3/2008 | Swaminathan et al. |
| 7,383,341 B1 | 6/2008 | Saito et al. |
| 7,385,917 B1 | 6/2008 | Mo et al. |
| 7,423,971 B1 | 9/2008 | Mohaban et al. |
| 7,426,206 B1 | 9/2008 | Ofek et al. |
| 7,426,471 B1 | 9/2008 | Briscoe et al. |
| 7,444,669 B1 | 10/2008 | Bahl et al. |
| 7,463,627 B1 | 12/2008 | Chase et al. |
| 7,466,703 B1 | 12/2008 | Arunachalam et al. |
| 7,467,208 B1 | 12/2008 | Hurtta et al. |
| 7,532,613 B1 | 5/2009 | Sen et al. |
| 7,555,542 B1 | 6/2009 | Ayers et al. |
| 7,583,665 B1 | 9/2009 | Duncan et al. |
| 7,600,007 B1 | 10/2009 | Lewis |
| 7,610,393 B1 | 10/2009 | Chen et al. |
| 7,653,735 B2 | 1/2010 | Mandato et al. |
| 7,673,057 B1 | 3/2010 | Yip et al. |
| 7,716,077 B1 | 5/2010 | Mikurak |
| 7,725,570 B1 | 5/2010 | Lewis |
| 7,725,571 B1 | 5/2010 | Lewis |
| 7,730,172 B1 | 6/2010 | Lewis |
| 7,747,240 B1 | 6/2010 | Briscoe et al. |
| 7,805,508 B1 | 9/2010 | Jones et al. |
| 7,817,619 B1 | 10/2010 | Curry et al. |
| 7,823,182 B1 | 10/2010 | Jiang et al. |
| 7,839,803 B1 | 11/2010 | Snelgrove et al. |
| RE42,204 E | 3/2011 | Utsumi et al. |
| 7,924,875 B2 | 4/2011 | Gerstel |
| 7,966,388 B1 | 6/2011 | Pugaczewski et al. |
| 7,990,882 B1 | 8/2011 | Bedair et al. |
| 8,032,409 B1 | 10/2011 | Mikurak |
| 8,072,901 B1 | 12/2011 | Blair et al. |
| 8,073,721 B1 | 12/2011 | Lewis |
| 8,121,874 B1 | 2/2012 | Guheen et al. |
| 8,595,478 B2 * | 11/2013 | Haney ............. 713/153 |
| 2004/0114569 A1 * | 6/2004 | Naden et al. ............. 370/351 |
| 2005/0216598 A1 * | 9/2005 | Wu et al. ............. 709/232 |
| 2014/0185519 A1 * | 7/2014 | Zhang et al. ............. 370/328 |

OTHER PUBLICATIONS

Request for Comments (RFC) 1191. Nov. 1990—Entire document.
Request for Comments (RFC) 1771. Mar. 1995—Entire document.
Request for Comments (RFC) 1858. Oct. 1995—Entire document.
Request for Comments (RFC) 1930. Mar. 1996—Entire document.

(56) References Cited

OTHER PUBLICATIONS

Request for Comments (RFC) 2178. Jul. 1997—Entire document.
Request for Comments (RFC) 2205. Sep. 1997—Entire document.
Request for Comments (RFC) 2206. Sep. 1997—Entire document.
Request for Comments (RFC) 2210. Sep. 1997—Entire document.
Request for Comments (RFC) 2212. Sep. 1999—Entire document.
Request for Comments (RFC) 2272. Jan. 1998—Entire document.
Request for Comments (RFC) 2328. Apr. 1998—Entire document.
Request for Comments (RFC) 2386. Aug. 1998—Entire document.
Request for Comments (RFC) 2430. Oct. 1998—Entire document.
Request for Comments (RFC) 2475. Dec. 1998—Entire document.
Request for Comments (RFC) 2490. Jan. 1999—Entire document.
Request for Comments (RFC) 2491. Jan. 1999—Entire document.
Request for Comments (RFC) 2512. Feb. 1999—Entire document.
Request for Comments (RFC) 2519. Feb. 1999—Entire document.
Request for Comments (RFC) 2547. Mar. 1999—Entire document.
Request for Comments (RFC) 2572. Apr. 1999—Entire document.
Request for Comments (RFC) 2662. Aug. 1999—Entire document.
Request for Comments (RFC) 2679. Sep. 1999—Entire document.
Request for Comments (RFC) 2680. Sep. 1999—Entire document.
Request for Comments (RFC) 2685. Sep. 1999—Entire document.
Request for Comments (RFC) 2697. Sep. 1999—Entire document.
Request for Comments (RFC) 2698. Sep. 1999—Entire document.
Request for Comments (RFC) 2702. Sep. 1999—Entire document.
Request for Comments (RFC) 2715. Oct. 1999—Entire document.
Request for Comments (RFC) 2745. Jan. 2000—Entire document.
Request for Comments (RFC) 2746. Jan. 2000—Entire document.
Request for Comments (RFC) 2748. Jan. 2000—Entire document.
Request for Comments (RFC) 2749. Jan. 2000—Entire document.
Request for Comments (RFC) 2750. Jan. 2000—Entire document.
Request for Comments (RFC) 2751. Jan. 2000—Entire document.
Request for Comments (RFC) 2752. Jan. 2000—Entire document.
Request for Comments (RFC) 2764. Feb. 2000—Entire document.
Request for Comments (RFC) 2814. May 2000—Entire document.
Internet-Draft draft-ietf-mpls-arch-07. Jul. 2000—Entire document.
U.S. Appl. No. 60/039,086, filed Mar. 14, 1997. First named inventor: Brian Kenner. Entitled, "System and Method for Selection and Retrieval of Diverse Types of Video Data on a Computer Network."
U.S. Appl. No. 60/039,672, filed Feb. 28, 1997. First named inventor: Larry Hinderks. Entitled, "Satellite Transmission Multicast System."
U.S. Appl. No. 60/057,857, filed Sep. 2, 1997. First named inventor: Paul W. Donahue. Entitled, "High Bandwidth Broadcast System Having Localized Multicast Access to Broadcast Content."
U.S. Appl. No. 60/082,792, filed Apr. 23, 1998. First named inventor: Eric R. Fossum. Entitled, "Wide Dynamic Range Fusion Using External Memory Look-Up."
U.S. Appl. No. 60/091,846, filed Jul. 6, 1998. First named inventor: Charles Robert Kalmanek. Entitled, "Routing Over Large Clouds."
U.S. Appl. No. 60/092,710, filed Jul. 14, 1998. First named inventor: Frank T. Leighton. Entitled, "Global Hosting System."
U.S. Appl. No. 60/097,866, filed Aug. 25, 1998. First named inventor: Hussein Farouk Salama. Entitled, "Method for Routing Internet Telephone Calls."
U.S. Appl. No. 60/100,723, filed Sep. 17, 1998. First named inventor: Tod W. McNamara. Entitled, "Ordered Networking."
U.S. Appl. No. 60/106,261, filed Oct. 30, 1998. First named inventor: Edmund Colby Munger. Entitled, "Agile Network Protocol for Secure Communications With Assured System Availability."
U.S. Appl. No. 60/123,434, filed Mar. 9, 1999. First named inventor: Ellen Louise Hahne. Entitled, "Border Gateway Reservation Protocol (BGRP) for Tree-Based Aggregation of Inter-Domain Reservations."
U.S. Appl. No. 60/137,704, filed Jun. 7, 1999. First named inventor: Edmund Colby Munger. Entitled, "Extensions to an Agile Network Protocol for Secure Communications With Assured System Availability."
U.S. Appl. No. 60/151,563, filed Aug. 31, 1999. First named inventor: Bryan Whittles. Entitled, "Method and Apparatus for a Globalized Automotive Newtork Exchange."
U.S. Appl. No. 60/152,289, filed Sep. 3, 1999. First named inventor: Kar-Wing Edward Lor. Entitled, "Enabling Voice Over IP Support in Network Switch."
U.S. Appl. No. 60/153,623, filed Sep. 13, 1999. First named inventor: Sanjoy Sen. Entitled, "Usage of RSVP Signaling in 3G.IP."
U.S. Appl. No. 60/157,925, filed Oct. 6, 1999. First named inventor: Robert Ryan. Entitled, "Hierarchical Output-Queued Packet-Buffering System and Method."
U.S. Appl. No. 60/163,193, filed Nov. 2, 1999. First named inventor: Irving B. McMurren. Entitled, "Ferroresonant Broadband Power Transformer."
U.S. Appl. No. 60/180,420, filed Feb. 4, 2000. First named inventor: Nicholas G. Duffield. Entitled, "Consistent sampling for network traffic measurement."
U.S. Appl. No. 60/186,054, filed Feb. 29, 2000. First named inventor: Imran N. Chaudhri. Entitled, "Apparatus and method for network content acceleration."
U.S. Appl. No. 60/191,819, filed Mar. 24, 2000. First named inventor: Saqib Jang. Entitled, "System and method for security and management of streaming data communications on a computer network system."
U.S. Appl. No. 60/196,297, filed Apr. 12, 2000. First named inventor: Mark Tuomenoksa. Entitled, "Network architecture, systems, and methods."
U.S. Appl. No. 60/202,296, filed May 5, 2000. First named inventor: Scott Ball. Entitled, "Construction of a very rich, multi-layer topological model of a computer network for purposes of fault diagnosis."
U.S. Appl. No. 60/202,297, filed May 5, 2000. First named inventor: Patrick Bosa. Entitled, "Method of improving the status suppression of a network management system."
U.S. Appl. No. 60/202,298, filed May 5, 2000. First named inventor: Chris Buia. Entitled, "Method and apparatus for performing integrated computer network, system and application fault management."
U.S. Appl. No. 60/202,299, filed May 5, 2000. First named inventor: Joe Greenwald. Entitled, "Method for diagnosing faults in large multi-layered environments guided by path and dependency analysis of the modeled system."
U.S. Appl. No. 60/205,529, filed May 19, 2000. First named inventor: Steven L Reynolds. Entitled, "Globally accessible computer network-based broadband communication system with user-controllable quality of information delivery and flow priority."
U.S. Appl. No. 60/208,659, filed May 31, 2000. First named inventor: Qian Zhang. Entitled, "Resource allocation in multi-stream ip network for optimized quality of service."
U.S. Appl. No. 60/209,795, filed Jun. 7, 2000. First named inventor: Kamran Sistanizadeh. Entitled, "Regional IP over fiber network service architecture."
U.S. Appl. No. 60/209,802, filed Jun. 7, 2000. First named inventor: Kamran Sistanizadeh. Entitled, "Operations and provisioning system for managed IP service over an optical fiber metro area network."
U.S. Appl. No. 09/325,687, filed Jun. 3, 1999. First named inventor: Edward T. Sullivan. Entitled, "Method and system for transmitting traffic in a virtual tunnel of a transmission line."

* cited by examiner

INTER-AUTONOMOUS NETWORKING INVOLVING MULTIPLE SERVICE PROVIDERS

CLAIM OF PRIORITY

This application is Continuation of U.S. application Ser. No. 11/942,616 filed Aug. 19, 2007 (now U.S. Pat. No. 8,595, 478), which in turn is a Continuation of U.S. application Ser. No. 11/299,110, filed Dec. 9, 2005 (now U.S. Pat. No. 7,318, 152), which in turn is a Continuation of U.S. application Ser. No. 09/613,004 filed Jul. 10, 2000 (now U.S. Pat. No. 7,111, 163). The entire content of each of these prior applications is incorporated herein by reference.

FIELD OF USE AND BACKGROUND OF THE INVENTION

The invention is useful in providing wide area networking services to clients with many locations among which data, especially high volumes of data, must be sent.

The prior art of WANs include frame relay and point-to-point networking offered by telephone companies. One type of Wide Area Network (WAN) service provided by telephone companies is leased lines. These may be analog or digital and are provide typically by a Local Exchange Carrier (LEC) on an intraLATA basis (Local Access and Transport Area). Inter-LATA leased lines are also available but must be provided by an Interexchange Carrier (IXC) with the LEC providing the local loop connection.

Another such WAN service is known as a Virtual Private Network. A VPN is intended for use by very large organizations with multiple locations. A VPN appears to the user as if it was private leased line trunk network, but it is not. VPN services are generally arranged with an Interexchange Carrier (IXC) with the points of the network termination (locations from which data will be sent and received being identified along with the level of bandwidth required at each termination. Dedicated circuits (telephone lines) are established between each network termination and the closest capable IXC POP (Point of Presence). Connections between POPS are not dedicated but are established by routers using routing tables to route the traffic over specified high-capacity transmission facilities on a priority basis to ensure the level of service provided is adequate and equivalent to a true private network using leased lines.

Other forms of Public Data Networks include: DDS, Switched 56 Kbps; Digital T-Carrier Systems; Digital 800 Services; X.25 Packet Switched Services; Broadband Data Networking such as Frame Relay and Cell Switching, ADSL, HDSL, Sonet, Switched Megabit Data Services, ISDN and Advanced Intelligent Networks.

Dataphone Digital Service (DDS) which was introduced by AT&T in 1974 and is generally end-to-end, fully digital, dedicated service provided my most carriers. DDS may be either point-to-point or multipoint. A head end Front End Processor controls all access to the network by polling remote devices. All communication must pass through the head end. DDS signals are carried within logical channels on T1 lines.

Switched 56 Kbps is a circuit switched (rather than dedicated line) digital service that serves the same applications as DDS although it is more cost effective for lower data volumes. All the components are the same as DDS but digital local loops and digital carrier exchanges are used. The main difference over DDS is that traffic is routed using a logical address which is the equivalent of a voice telephone number. The circuit is set up, maintained and torn down much like a voice call is switched and pricing is similar. The cost is sensitive to distance, duration, time of day and day of the year.

Digital T-carrier systems (including fractional T1 service) are dedicated links carry digital data over multiple logical channels on a single physical communication circuit with the logical channels established by time division multiplexing.

Digital 800 service was introduced in 1994 by AT&T and is intended for medium to high volume customers subscribing to high volume 800 service offerings.

X.25 packet switching was invented in the early 60's and was implemented on ARPANET in 1971. X.25 is a dial up service as is ISDN and Switched 56/64 Kbps WANS, and, as such, is not suitable for dedicated WANs such as the WANs in the AlterWAN™ network genus of the invention. The basic concept of packet switching provides a highly flexible, shared network in support of interactive computer communications in a WAN. Prior to packet switching, users spread over a wide area with only infrequent traffic had no cost effective way of sharing computer resources. Asynchronous communications are bursty in nature and send only small amounts of data with lots of idle time between bursts. Having dedicated lines for such communication is a waste of bandwidth and expensive. Packet switching solved those problems by providing connections as needed which were billed on the number of packets transmitted. Packet switching also improved the error performance. Typically a packet switched network uses a dial up connection to a packet switching node. Once the connection to packet switching node is made, a control packet is sent to establish the session with the target host. The control packet is forwarded across the most direct link that is available in a number of hops between nodes. The target host responds with a control packet sent back to the source to establish the session. Each packet is numbered sequentially and transmitted. ISDN is an entirely digital suite of dial-up data communication services delivered over the twisted pair local loop. ISDN lines have B channels that carry information, D-channels that carry data for signalling and control, H-channels that carry high speed data for bandwidth intensive applications. It has been a commercial failure.

Frame relay networks were first deployed in the mid 90's and are somewhat like packet switching in that each frame is individually addressed. Frame relay makes use of special switches and a shared network of very high speed. Unlike packet switching, frame relay supports the transmission of virtually any computer data stream. Frames are variable in length up to 4096 bytes. Frame relay is data oriented and does not support voice or video very well. As is the case for X.25 packet switching, frame relay overhead is high and delays in transmission are expected. Further, network congestion can result in loss of data. Although frame relay networks appear to the customer to be one-hop networks, they really are not one hop nets. There are many links between multiple Central Office (CO) switches inside the typical frame relay cloud. Each hop adds latency and the possibility of running into bandwidth congestion. Further, frame relay networks cannot cross telephone company boundaries so all sites on a frame relay WAN must be using the same frame relay provider, i.e., it not possible for some sites to be coupled to AT&T frame relay COs and other sites to be coupled to MCI or Sprint COs. Every frame has a DLCI code in the header that identifies the customer and the virtual data path through a particular telephone company for the traffic. Therefore, it is not possible to mix frames with different DLCIs because different telco DLCIs have different formats and that will disrupt the routing process for such frames through the CO switches. If two locations on a frame relay network cannot both be served by the same frame relay provider, a second frame relay cloud must be built and the two clouds connected together by two routers at some common location that can be coupled to both clouds with the two routers coupled together by a local area network.

Cell switching has been conventionally thought to be the future of data communication networks. Cell switching encompasses both ATM networks and Switched Multimegabit Data Service (SMDS). Data is organized into cells of fixed length of 53 octets and are shipped across high speed facilities and switched in high speed, specialized switches. ATM is primarily data oriented, but is supports voice and video effectively. Cell switching is high cost and has high overhead and suffers from a lack of fully developed standards. ATM networks are also not widely commercially available yet.

The problem with all these approaches is that they are expensive with recurring telephone company charges.

The internet as a backbone has recently loomed as a possibility for implementing wide area networks and lowering the cost. However, there are several problems with using the internet as a WAN backbone. Generally, these problems all relate to quality of service. Quality of service has to do with both errors in transmission as well as latency. Latency or delay on critical packets getting from source to destination can seriously slow or disrupt operations of computer systems. Latency can also destroy the efficacy of streaming video, streaming audio and streaming multimedia product and service delivery by causing visible and/or audible gaps in the presentation of the program encoded in the data to the user or freezes. This can be very distracting and undesirable in, for example, video conferences, video-on-demand, telephone calls etc. Latency is also a problem when large documents are being downloaded because it slows the process considerably. Latency arises from multiple hops between nodes on the internet coupling the source to the destination.

Prior art attempts to use the internet as a backbone did not control the number of hops and available bandwidth in the data path from source to destination. As a result the number of router hops along the route and the lack of available bandwidth precluded the use of the internet as a viable private network backbone alternative. ISP's built local businesses without regard to the customers regional, national or international presence as their objective was only to offer LOCAL internet access. This resulted in attempts to use the internet as an alternative private network backbone of routes that may have few hops or many hops. Routes that may have inadequate bandwidth for the worst case bandwidth requirement of a WAN were sometimes picked and that resulted in failure. This uncontrolled hop count, and lack of control of the data paths and the available bandwidth and the resulting latency caused problems in implementing WANs on the internet.

Another major problem with using the internet as a backbone is security or privacy. Since the internet is a public facility, private and sensitive data transmitted over the internet is subject to snooping.

Thus, there has arisen a need for a system which can use the internet as a WAN backbone to help decrease the costs of data transport while not suffering from the aforementioned latency, privacy and bandwidth availability problems.

SUMMARY OF THE INVENTION

The wide area network technology described herein (referred to as AlterWAN™ network) is an alternative wide area network that uses the internet as a backbone with any telephone company providing the local loop connection to the first participating ISX/ISP and any telephone company providing a local loop connection from the endpoint participating ISX/ISP to the destination router. This greatly reduces monthly costs to customers and removes the frame relay restriction that the same telephone company must provide all data paths including the local loops at both ends. High quality of service is maintained by mimicking the "one hop" private network structures of prior art frame relay and point-to-point networks. Any WAN that uses the internet as a backbone and mimics the "one hop" structure of private frame relay and point-to-point networks by any means is within the genus of the invention.

A key characteristic that all species within the genus of the invention will share is a tuning of the internet network routing process by proper ISX selection to reduce the hop count thereby reducing the latency problem that has plagued prior failed attempts to use the internet as a WAN backbone.

Another key characteristic that all species within the genus of the invention will share is the transmission of secure encrypted data along preplanned high bandwidth, low hop-count routing paths between pairs of customer sites that are geographically separated. The encrypted AlterWAN data is sent through a high bandwidth, dedicated local loop connection to the first participating AlterWAN ISX/ISP facility. There, the AlterWAN packets are routed to the routers of only preselected ISX facilities on the internet. The preselected ISX/ISP facilities are ones which provide high-bandwidth, low hop-count data paths to the other ISX/ISP facilities along the private tunnel. The routers of these participating ISX/ISP facilities are specially selected to provide these high-bandwidth, low hop-count data paths either by their natural routing tables or by virtue of special routing tables that these ISX/ISP providers establish to route AlterWAN packets through high-bandwidth, low hop-count paths and route other internet traffic along other paths. For example, if a customer site in San Jose needs to have AlterWAN service to another site in Tokyo, a "private tunnel" is built in each direction through the internet and two dedicated local loops, one at each end are established to connect the two customer sites to the first and last participating ISX providers in the private tunnel. Data security is implemented by the use of conventional or custom firewall/VPN technology. At each customer site, a firewall/VPN device is configured to securely encrypt the payload of each AlterWAN packet to be sent through a "private tunnel" to the far end customer site where the payload is decrypted. Using conventional firewalls, the encryption method and the encryption keys used at both ends for transmissions in both directions are the same. However, the invention also contemplates using one encryption algorithm and encryption key or keys for downstream transmissions and another encryption method and different key or keys for the upstream direction. This method may require the use of custom designed firewalls. Whichever method is used, the firewalls at both ends use the same encryption method and key or keys for encryption of packets at the source and decryption of them at the destination by predetermined configurations that are programmed into the firewalls. Only packets identified at the source end firewall with a destination IP address at the other end of an AlterWAN "private tunnel" have the payload of the packet encrypted before being sent. Once they are encrypted, they are sent across the preplanned route to the destination where the far end firewall recognizes the IP address of the packet as being addressed to it. Only those packets are decrypted and transmitted to the device to which they are addressed and other packets that are not AlterWAN packets are either rejected or routed to some other device which is not part of the AlterWAN network.

In other words, the quality of service problem that has plagued prior attempts is solved by providing non-blocking bandwidth (bandwidth that will always be available and will always be sufficient) and predefining routes for the "private tunnel" paths between points on the internet between ISX facilities. Participating ISX facilities agree to provide nonblocking bandwidth between their sites. By having private tunnels to each location of a worldwide company for example, an engineer in San Jose can connect directly to a LAN at a branch office in Paris and "see" on his/her computer's desktop all the shared items on the Paris LAN such as various servers, printers etc.

This preplanning of the routing path causes traffic from AlterWAN™ customers to be transmitted quickly and without delay from end to end and not experience delays due to lack of bandwidth or excessive hop count. Because the packet payload is encrypted, the data is secure during its transport across the internet through the "private tunnel". The AlterWAN™ network design minimize the number of hops each AlterWAN™ network packet experiences in its travel from source to destination thereby reducing latency by causing AlterWAN traffic to be routed only over high bandwidth lines coupling participating ISX/ISP providers. Recently, there has been a large amount of building of ISX internet providers having fiber optic data paths to other providers to provide large amounts of bandwidth. Typically, one or both of the routers at the source and destination of the AlterWAN™ network can be co-located at the first ISX.

The privacy problem is overcome by firewalls provided in the AlterWAN™ network at every customer premises which are encrypting firewalls (preferred firewalls are commercially available from Netscreen). Every outgoing AlterWAN™ packet (AlterWAN packets are those packets which are encrypted and are transmitted along predefined routes through the internet in "private tunnels") is encrypted by the firewall at the source using a preconfigured encryption algorithm although any encryption algorithm such as conventional DES encryption that uses a key will suffice. The encryption process requires the preprogramming of "private tunnel" identities and the associated encryption and decryption keys. The "key" is used by the firewall/VPN device for encryption and decryption of the packet payload. Keys are preassigned for each "private tunnel" and are generated by the firewalls at each end from one or two passwords that are programmed into the firewall when the private tunnel is set up. Encrypted packets are routed over predefined paths. Packets intended for the general internet are not encrypted and are passed out to the first ISX to find their way through the internet by the normal routing process. Each packet that is intended for a predefined private tunnel is encrypted and sent out through a dedicated high bandwidth local loop to the first ISX. From there it is routed along a predefined route established by proper selection of ISX providers.

The key can remain the same over time or change, but no packet encrypted without the current key for a particular tunnel can be decrypted at the destination. The keys are never transmitted along the tunnels. They are configured into the firewalls by prearrangement at each end. Each tunnel has a different key.

A "private tunnel" is defined as the data path through the internet from the source firewall to the destination firewall through the predefined, low hop count, high bandwidth path. The private tunnel is established by proper selection of ISX providers. This is done by studying the normal routing paths used by all the ISX providers between a pair of customer sites to be connected by the tunnel. Then ISX providers which normally route along high bandwidth links with a minimum hop count are selected to participate. When AlterWAN packets reach these ISX providers, the normal routing that occurs there results in the AlterWAN encrypted packets travelling along a high bandwidth low hop count path.

The ability of firewalls to encrypt and decrypt is known and commercially available and is simply being used in the AlterWAN network. Browsers at workstations at customer AlterWAN sites however can be pointed to any website on the internet and can send and receive packets to and from those sites without restriction. Those packets are referred to herein as conventional packets, and they get to their destinations by conventional internet routing and do not pass through the private tunnels created by the AlterWAN data structures.

The AlterWAN data structures really are just IP addresses and associated data in the firewalls and routers along the tunnel that cause the packets to travel the low hop count path. The AlterWAN data structures will vary from customer to customer depending upon which sites are to be linked and the locations and IP addresses of the participating ISX/ISP providers through which the hops of the private tunnel will pass.

Finally, all species in the genus of the invention will solve the bandwidth bottleneck that has plagued prior attempts to use the internet as a WAN backbone. This is done by implementing AlterWAN™ routing strategies. An AlterWAN data path extends from a source router (having a channel service unit to interface between the packet world of routers to the physical and media access control and/or signalling protocols of the telephone line) through a sufficiently high bandwidth dedicated local loop line to the first participating ISX or Internet Service Provider (ISP) that is a participating provider of AlterWAN™ network services. From there it extends along a data path between other participating ISX providers along a data path which is guaranteed to have sufficient bandwidth to be able to handle the worst case bandwidth consumption of the customer. In the claims, such an ISX or ISP provider is referred to as a "participating ISX/ISP". All the ISX or ISP facilities that are participating in the AlterWAN network structure have fiber optic or other high bandwidth data paths such as OC3 or OC12 data paths available to them to send data to other ISX/ISP facilities that are participating in the AlterWAN™ network. It is these high bandwidth links which are referred to as "core bandwidth" between participating ISX/ISP facilities. It is this core bandwidth over which AlterWAN™ "private tunnel" traffic is routed on the internet backbone.

The dedicated lines from the source router at the customer premises to the nearest participating ISX/ISP is typically T1 class or better in bandwidth, but it only needs to have two characteristics: it must be dedicated and not dialup; and, it must have sufficient bandwidth capacity to handle the worst case bandwidth consumption of the particular client facility it serves. Such a line is referred to in the claims as a "dedicated line". Thus, the dedicated lines from the source router to the nearest participating ISX/ISP may also be DSL or fractional TI.

The "participating ISX/ISP" to which the "dedicated line" couples may not be the nearest ISX/ISP since it is a rule of the AlterWAN™ network to only choose ISX/ISP facilities that restrict the loads in their data paths so as to have large amounts of spare bandwidth capacity. For example, AboveNet typically has loads of 50% or less in their high bandwidth data paths to other ISX facilities. Therefore, AlterWAN™ network species will all have their dedicated connections to ISX/ISP facilities that have lots of spare bandwidth capacity and definitely more than the anticipated worse case bandwidth consumption of the customer so there is never a bandwidth bottleneck even if that ISX/ISP facility is not the closest facility. Although the local loop costs will be higher in such situations, the savings by using the internet as a backbone without quality of service problems will greatly outweigh the burden of higher local loop costs.

The use of the dedicated lines to the nearest participating ISX/ISP and selection of only ISX/ISP facilities that limit the traffic in their data paths so as to have a great deal of spare capacity are the two characteristics of all AlterWAN™ network species which solve the prior art bandwidth bottleneck problems.

The above described structure controls the three major unpredictability factors that have frustrated prior workers in the art who have attempted to use the internet to implement WANs: hop count, bandwidth availability, and latency. The advantages of the AlterWAN™ network structure and operation are: large savings in Telco charges.; clean implementation of security not requiring PC or workstations to load special client software; use of ISX core internet bandwidth with sufficient bandwidth available for worst case scenarios and with a robust fault tolerant infrastructure; the ability to offer full or partial turn-key solutions to WAN needs; local loops may be a mix of different services and speeds from different providers; an apparent one hop route to each location; customer access to local router and firewall; both public and private IP addressing can be used; communications are secure through secure tunnels using encrypted packets; and no need to rely on quality of service software processes at either end to get data, voice and video through since the AlterWAN network controls hop count, latency and bandwidth availability inherently by its structure and operation.

DETAILED DESCRIPTION OF THE PREFERRED AND ALTERNATIVE EMBODIMENTS

Typically 60-80% of wide area network costs over a five year period are recurring telephone company charges for their frame relay and point-to-point networking services. These charges break down into: local loop charges to have the connection; a distance charge depending upon the distances between nodes; and, a bandwidth charge for the minimum bandwidth the customer specifies. These costs can typically be drastically reduced by using the internet as a WAN backbone, but only if the latency and other quality of service problems that have plagued prior art attempts can be solved. These costs can be drastically reduced over frame relay and point-to-point networks even if extra costs of crossing telephone company boundaries are not incurred. The AlterWAN™ network of the invention does not have any telephone company boundary problems to overcome.

Figure 1:
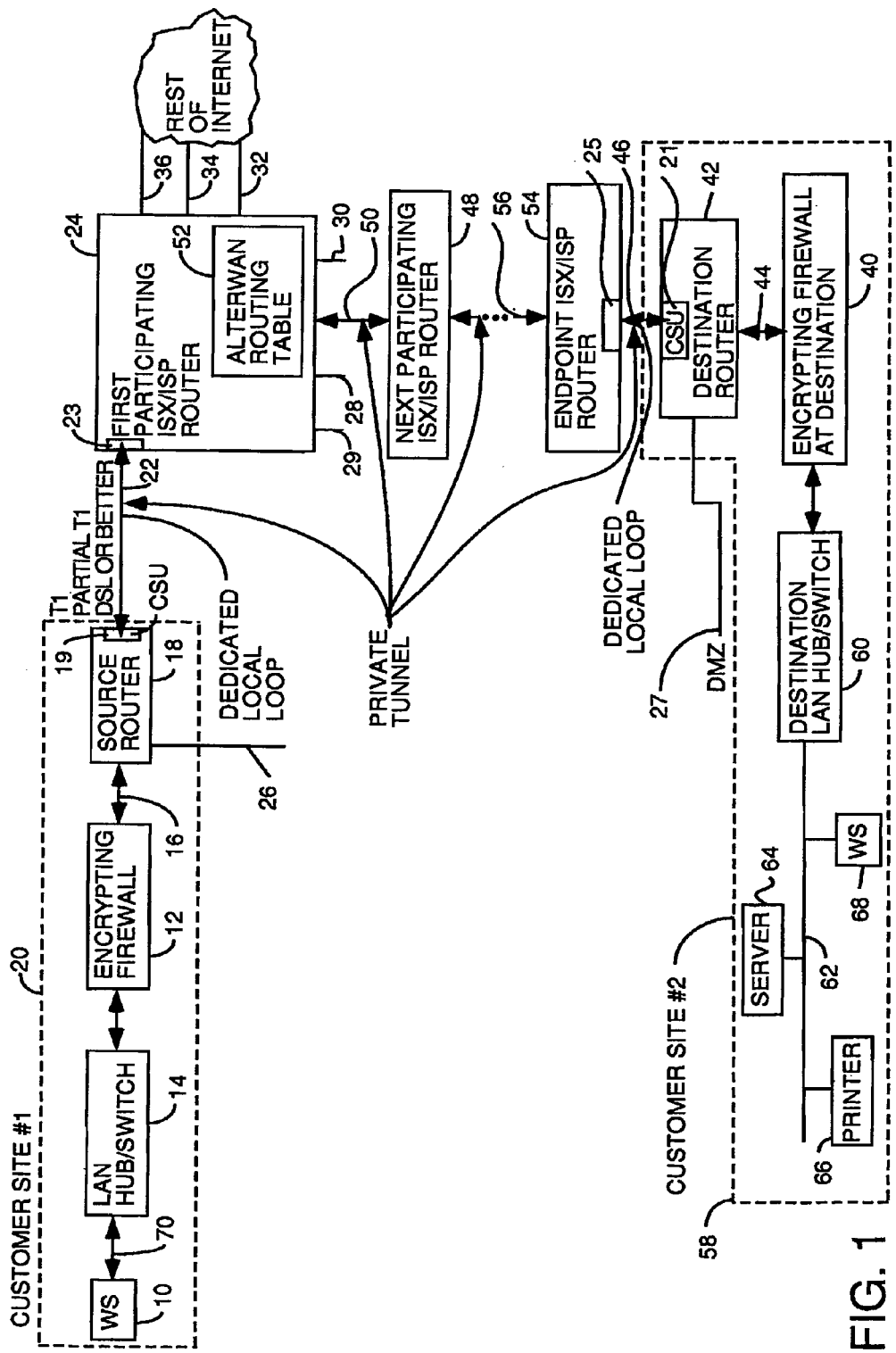
FIG. 1 is a block diagram of a WAN using the internet as a backbone according to the genus of the invention.

Referring to FIG. 1, there is shown a block diagram of a wide area network species within the genus of the wide area networks using the internet as the backbone with controlled, small hop count, reduced latency and adequate bandwidth for the worst case scenario. A work station 10 (or server or any other peripheral) is typically coupled to an encrypting/decrypting firewall 12 by a local area network represented in this case by a LAN hub or switch 14. The work station 10 or other device may also be coupled to the firewall 12 by a dedicated line in alternative embodiments, and there may be more than one workstation or other device coupled to the firewall 12 either by LAN 14 or by individual dedicated lines. The preferred firewall is manufactured by Netscreen, but any encrypting/decrypting firewall that uses a customer defined key to encrypt each AlterWAN™ packet that has an IP destination address at the end of an AlterWAN private tunnel will suffice.

The function of the firewall, in one embodiment, is to receive and encrypt downstream packets addressed to nodes at the destination site on the AlterWAN network and to receive conventional internet protocol packets (hereafter IP packets) addressed to some other IP address on the internet and distinguish them from AlterWAN packets and not encrypt them. Both AlterWAN and conventional IP packets are sent to the firewall from the workstation 10 or other peripherals at customer site 1, shown in dashed lines at 20. One function of the firewall 12 (and the corresponding firewall 40 at the destination) is to distinguish between AlterWAN packets and conventional IP packets. AlterWAN packets are those packets which are addressed to destinations at the end of an AlterWAN private tunnel. Conventional packets are IP packets addressed to any other IP address other than an address at the other end of an AlterWAN private tunnel. The firewall at each end of a private tunnel are configured to encrypt AlterWAN packet payloads and send them to a router at the location of firewall from which they are converted to a suitable signal format for transmission on a dedicated local loop connection and transmitted to the first ISX/ISP provider along predefined high bandwidth, low hop-count private tunnel through the internet. Conventional IP packets are not encrypted and are sent to the router and on the same dedicated local loop connection to the first participating ISX/ISP where they are routed to their destinations without using the private tunnel high bandwidth, low hop-count route. The firewalls make this distinction by examining the packet headers and using the destination address information and one or more lookup tables to determine which packets are AlterWAN packets addressed to nodes on the AlterWAN network and which packets are addressed to any other IP address outside the AlterWAN network.

More specifically, at each end of a private tunnel, a packet addressed to any of the IP addresses of devices at the other end of a private tunnel are recognized as packets that need to be converted to AlterWAN packets, encrypted by the firewall and encapsulated in another IP packet having as its destination address the IP address of the untrusted side of the firewall at the other end of the private tunnel. The composite AlterWAN packet is comprised of the encrypted original IP packet with an AlterWAN packet header which has as its destination address the IP address of the untrusted side of the destination firewall. At the firewall at the other end, these incoming AlterWAN packets will recognized because their destination addresses match the IP address of the untrusted side of the firewall. The firewall then strips off the AlterWAN packet header of the encapsulating packet and decrypts the original IP packet that was encapsulated using the same encryption algorithm and key or keys that were used to encrypt it. The decrypted packet then has an IP packet header which has a destination address which matches the IP address of some device on the LAN on the trusted side of the destination firewall. The decrypted packet is then put on the destination LAN and makes its way to the device to which it was addressed.

The main function of the firewall is to encrypt the payloads of only AlterWAN packets with customer defined key or keys which are configured to be the same in the firewalls at both ends of the tunnel. In the preferred embodiment, commercially available firewalls are used which are configured to use the same encryption algorithm and encryption keys at both ends of each tunnel for packets travelling in either direction along the tunnel. However, in alternative embodiments, firewalls may be used which use one encryption algorithm and set of one or more encryption keys for packets travelling in one direction along the tunnel and another different encryption algorithm and/or a different set of keys in the firewalls at each end of the tunnel for packets travelling in the opposite direction. The corresponding firewall/VPN device at the tunnel far end must be programmed with the exact same key used to encrypt the packet to decrypt the packet. The encrypted packet is tested with the local key to decrypt the packet. If a match exists, the packet is decrypted and allowed through the firewall/VPN device. If not, it is discarded. Many firewalls set the encryption method and key the same for both directions of a private tunnel. In the event a firewall/VPN device implements a private tunnel by using a different encryption method and or key for each half of a private tunnel, and that both firewall/VPN devices are configured properly, they may be implemented and used in an AlterWAN network solution. The key can be the same for all AlterWAN packets over time or it can change over time. Any encryption algorithm capable of doing this will suffice. Any conventional IP packets are not encrypted by the firewall and are simply forwarded to a router such as source router 18 or destination router 42.

The firewalls 12 and 40 are typically coupled by another local area network line to a router at the source or destination site. For example, firewall 12 is coupled by LAN line 16 to a router 18 at customer site 1, and firewall 40 is coupled by a LAN line 44 to destination router 42. Routers 18 and 42 each function to route AlterWAN and conventional IP packets differently. Both routers 18 and 42 route any AlterWAN packet into a "private tunnel" of a dedicated high bandwidth local loop data path 22 which guides these AlterWAN packets to the first participating ISX/ISP 24 in the AlterWAN™ network. The first and last participating ISX/ISP providers also have channel service units represented by boxes 23 and 25. Any conventional IP packets are also routed into dedicated data path 22, but these conventional data packets are not part of the AlterWAN private tunnel because their destination addresses are not the address of the destination at the other end of the tunnel. Each of routers 18 and 42 includes a channel service unit, as shown at 19 and 21. These channel service units convert the digital data of the packets into signals suitable for transmission on whatever type of dedicated local loop signal path 22 and 46 are selected. The local loop dedicated signal paths 22 and 46 do not need to be the same type of signal path at both ends so long as suitable channel service units or cable modems are selected for CSUs 19 and 21.

The dedicated line 22 is typically a T1 class, partial T1 or DSL line or better with adequate bandwidth in both directions to meet the worst case bandwidth consumption scenario. DSL lines are typically not preferred since they typically only have about 640 Kbps bandwidth upstream to the CO even though they have 1.544 Mbps downstream or better. There are however some ADSL variations with up to 5 Mbps upstream and 51.84 Mbps downstream from the CO to the customer sites. One variant of ADSL supports 15 Mbps upstream and 155 Mbps downstream, but the customer ADSL modem must be within 500 meters of the central office so such a line is highly impractical unless the AlterWAN customer site is virtually at the CO. Since the AlterWAN™ network is bidirectional and must have sufficient bandwidth on all data path segments thereof to meet the worst case scenario, DSL lines typically cannot be used unless the worst case scenario does not exceed the DSL line upstream bandwidth specification. Also, for DSL lines, the CO must be within about 2 miles (0.6 to 1.2 miles for the higher speed variants) from the customer site and this restriction can rule out their use if a deal with a participating ISX/ISP within that range cannot be made.

Each of routers 18 and 42 have a channel service unit (not separately shown) built into the router (or external). The function of these channel service units in the local loop is to electrically and physically convert the (LAN) ethernet data to the signalling protocols and signal format of the telco on whatever dedicated lines 22 and 46 are chosen. The dedicated lines can be different (telephone lines or hybrid fiber coax of a CATV system or digital cable or satellite bidirectional links) and can be provided by different vendors. For example, if the dedicated line 22 is a T1 line the channel service units converts the AlterWAN packet data into signaling compatible with the chosen telco and transmission of that data to the matching CSU/router at the other end of the local loop where the signal is converted back to a format acceptable for processing be the router at the ISX. If the dedicated line is the hybrid fiber coaxial digital cable of a CATV system using frequency division multiplexing or code division multiplexing or discrete multitone modulation, the channel service unit modulates the ethernet onto the proper FDMA carriers or spreads the spectrums for transmission across the "local loop" with the spreading codes dedicated to the AlterWAN connection. This interfacing is bidirectional between the signal formats and protocols on dedicated lines 22 and 46

Routers 18 and 42 are the translators of the AlterWAN™ network private tunnel. The routers translate from ethernet protocol to the telco protocol on the dedicated lines 22 and 46. Other conventional IP packets that reach router 18 are routed along the same physical path and the dedicated lines but really are on a different logical path. Their payloads are not encrypted and they are not sent through the "private tunnels". AlterWAN packets addressed to different destinations will be routed into the proper private tunnels of the AlterWAN network set up for those destinations. In some embodiments, conventional IP packets will be blocked by router 18 from entering the private tunnel or any other logical channel of the dedicated lines 22 and 46. Data path 26 leaving router 18 is a DMZ path and is optional. Likewise, destination router 42 includes a DMZ port 27. The DMZ path can be any other data path that is not part of the AlterWAN network, and is typically where mail servers reside.

One of the side effects of having the high speed dedicated line 22 is that workstations at the client facility 1 (and the client facility at the other end of the WAN) can also have high speed internet access to other websites that have nothing to do with the AlterWAN solution without a separate connection. The AlterWAN traffic on dedicated line 22 shares this transport with non-AlterWAN traffic so it is important that the bandwidth on this dedicated local loop meet the aggregate needs of both AlterWAN traffic and conventional traffic. As part of this process, packets that are not AlterWAN packets are recognized by the firewall by looking at the addressing information in packet header information and are not encrypted. Conversely, packets that appear to the firewall to be addressed to nodes in the AlterWAN network have their packet payloads encrypted. All the packets are then sent to the source router 18 (or destination router 42) which routes them. Conventional packets get routed on dedicated line 22 other than the AlterWAN private tunnel to the first participating ISX/ISP 24. At the first ISX/ISP 24 in the AlterWAN network, these conventional packets get routed out one of the data paths represented by lines 27 through 36 that couple router 24 to the rest of the internet. This provides high speed access to other web pages and websites and e-mail services as a byproduct of the AlterWAN hardware and software processing.

AlterWAN packets get routed at the first ISX/ISP 24 into a high bandwidth data path 50 to the next participating ISX/ISP 48 in the AlterWAN network. Data path 50 is selected for the AlterWAN packets by the preselected ISX/ISP and peer level predefined routing between participating ISX/ISP's. This allows AlterWAN traffic to be transported between locations utilizing the naturally existing routes but those routes are selected so as to be high bandwidth and low hop count. Each router in the participating ISX/ISP facilities connects and communicates in the same fashion. AlterWAN networks, by design, require selection of the ISX/ISP partners for any given network based on many factors including the ease of implementation by utilizing naturally occurring or other existing high bandwidth, low hop count routes. AlterWAN designers pretest these routes by performing a minimum of a ping test and traceroute test to verify the path data that AlterWAN packets will take through the private tunnel that is to be implemented as an AlterWAN connection. AlterWAN partners do not normally need to add special routes, but implementing AlterWAN network designs that follow existing known paths does not preclude the addition of special routing from time to time as needed to afford better routing. By such a process, an AlterWAN network does not require each participating ISX/ISP to make alterations to their equipment for each "private tunnel" created but rather transparently utilizes the high bandwidth peer level connections between ISX/ISP's. However, the invention does not preclude use of ISX/ISP providers who have altered their routing tables so as to insure that AlterWAN packets get routed along high bandwidth, low hop-count data paths while non-AlterWAN packets get routed along other data paths. Participating ISX/ISP's are selected in part based on their ability to use these natural routes to form low hop count connections between the ends of an AlterWAN private tunnel or by entering into a special deal with one or more other participating ISX/ISP's to implement special peering arrangements and/or routing between each other to allow only AlterWAN traffic to use these special low hop count high bandwidth connections forcing non Alter-WAN traffic to follow other natural routing that does not provide the bandwidth and or hop counts that meet the AlterWAN requirement.

In the example of FIG. 1, only three participating ISX/ISP providers are shown at 24, 48 and 54. The high bandwidth paths are the naturally occurring data paths that result from the routing tables in the participating ISX provider routers. These data paths are represented by lines 50 and 56. The private tunnel between customer site #1 at 20 and customer site #2 at 58 is implemented by the dedicated lines 22 and 46 and the high bandwidth data paths 50 and 56 selected for AlterWAN packets by the routing tables in participating ISX/ISP providers 24, 48 and 54.

When AlterWAN packets from customer site #1 reach endpoint ISX/ISP router 54, they are routed onto dedicated line 46 to the channel service unit of destination router 42. The destination router 42 recovers and reassembles the ethernet packets and outputs them to firewall 40. Firewall 40 decrypts all AlterWAN packets with its local matching key preconfigured on the firewall/VPN device and formats them to the LAN protocol. It then forwards them to the destination LAN hub or switch 60 where they are sent out on LAN 62 addressed to whatever peripheral 64, 66 or 68 to which they are destined. AlterWAN packets from any of these peripherals addressed to any of the peripherals at customer site #1, 20, are encrypted by firewall 40 and are routed back through the private tunnel to site 20 where they are decrypted by firewall 12 and forwarded to LAN hub or switch 14 and sent out on LAN 70 to whatever peripheral at site 20 to which they are addressed.

Firewall and Tunnel Setup

The firewalls 12 and 40 can be any commercially available firewall with the ability to create a virtual private network. The firewalls serve two general purposes: they provide general security from unwanted access to the AlterWAN customer LAN network; and they provide private encrypted tunnels between a known set of sites even though the internet is a public facility. Each customer's AlterWAN network will be different based upon their needs in terms of the type and bandwidth of dedicated lines used and the private tunnel data paths set up through the participating ISX/ISP providers between customer sites.

The interfaces of a firewall consist of an untrusted WAN interface, one or more trusted IP interfaces to dedicated lines or LAN drop lines, and a DMZ interface (if available). These three interfaces are illustrated at 72, 74 and 76, respectively, in FIG. 2 which is a block diagram of the actual hardware configuration of a typical AlterWAN network. The untrusted or WAN interface is used to interface to the ISX/ISP premises router of the public internet, optionally through a customer premises router 18 or 42. The IP trusted interface interfaces to the customer's private local area network 70 or 62 (or to dedicated lines to each peripheral in some embodiments). The DMZ interface (optionally available on some firewalls) is used to configure a separate network where devices that may need both public and private access typically are placed including WEB servers and e-mail servers.

Figure 2:
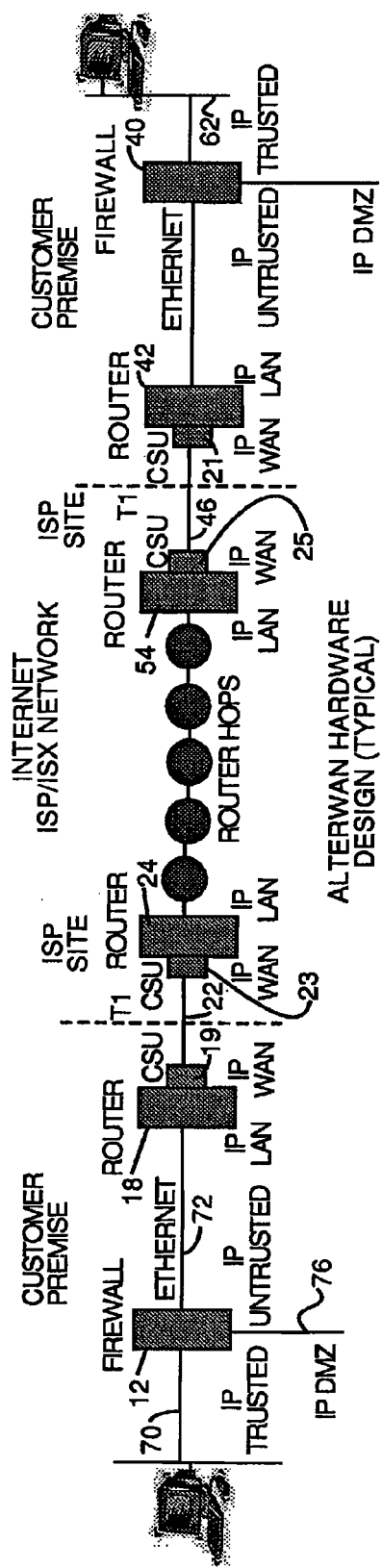
FIG. 2 is a block diagram of the actual hardware used in a typical AlterWAN network.

Every LAN and WAN interface at both the customer premises and the ISX/ISP in FIG. 2 needs to be configured with IP addresses. The exception to this would be any LAN using a protocol different than ethernet IP such as Token Ring. In such case the proper networking and conversion equipment would be required. Each interface to be configured in general includes: an IP address, for example 204.123.111.150; a network mask, for example 255.255.255.0; and a default gateway, for example 204.123.111.1. The addressing for each interface is either supplied by the ISX/ISP or by the customer. The telephone (or cable system operator) high bandwidth dedicated lines 22 and 46 need to be in place and operational in addition to the configurations mentioned above to complete the AlterWAN structure.

Tunnels and encryption methods vary between manufacturers of firewalls and virtual private network (hereafter VPN) equipment. This limits the ability to mix products from different manufacturers within a specific customer's AlterWAN setup because the firewalls/VPN process at each end of each tunnel must use the same encryption algorithms so AlterWAN packets can be properly encrypted and decrypted. If however, all firewalls from all manufacturers can be modified to use the same encryption algorithm, then firewalls/VPN processes from different manufacturers can be mixed and matched. The VPN processing hardware and software to encrypt and decrypt AlterWAN packets can be integrated into the firewall or external to it.

Figure 3:
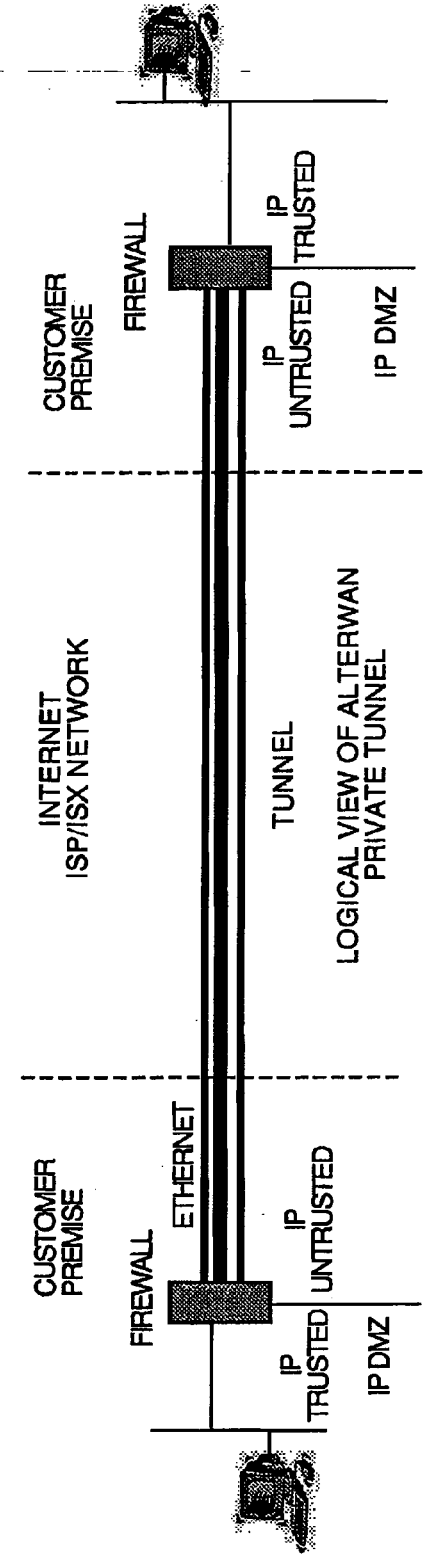
FIG. 3 is a logical view of an AlterWAN private tunnel.

A virtual private network tunnel requires the following basic components and data structures at each end of the tunnel. There must be a virtual private network process running on a VPN processor (can be the same processor as the firewall processor) or external to a firewall on each end of the private tunnel. The untrusted address of the far end VPN untrusted WAN interface must be configured in the VPN configuration data structure at each end including a mnemonic label, an IP address and a network mask. The VPN configuration data structure at each end must also include a mnemonic label, an encryption key, an encryption type, an encryption password, and the gateway IP address of the far end firewall untrusted or WAN interface. Only when a VPN pair configured in this manner exists with one VPN on each end of a proposed tunnel, and the participating ISX/ISP providers route a path between the two endpoints over high bandwidth links with a minimum number of hop for AlterWAN packets, does the private tunnel actually exist. Once the tunnel is created, all the conventional internet routers and uncontrolled number of hops and uncontrolled latency that they create for non Alter-WAN packets virtually disappear for AlterWAN packets. The AlterWAN data path logically appears to be a direct point-to-point connection between the two sites at opposite ends of the tunnel as shown in FIG. 3.

Private tunnels are defined for each customer based upon the needs of that customer. This is done by identifying a set of known participating ISX/ISP locations through which the number of known hops caused by their routers is minimized. All locations on the internet outside this known set of sites and the associated networks are assumed to be general internet sites to which conventional IP packets can be directed.

The only real difference between a conventional IP packet and an AlterWAN packet is that the payload of the AlterWAN packet is encrypted Conventional packets have no encryption performed on the packet payload and are routed to the default gateway IP address of the participating ISP/ISX.

The firewalls at each end of each private tunnel prevent any unauthorized user from accessing the private LANs of Alter-WAN customers. The tunnels in each firewall have configuration data that only allows specific user traffic access to the private tunnels. Traceroutes to any address outside the tunnel show all router hops for conventional packets while traceroutes to any address inside a private tunnel shown only private tunnel hops for AlterWAN traffic. The establishment of a private tunnel enables users at a first customer site to appear to be directly connected to a LAN at another site of the customer so that all the shared resources on the other end of the tunnel appear on the desktops of the workstations at the first site. Most of the participating providers in AlterWAN structures are ISX providers. This eliminates the numerous hops customers typically incur in dealing with local ISPs for wide area networking. By picking participating ISX providers that have high bandwidth lines that are not fully utilized, the bandwidth availability problem of using the internet as a WAN backbone is solved. Numerous ISX providers now offer 1-hop connections to major cities in the U.S. and throughout the world. The AlterWAN network structure takes advantage of this fact by selecting the ISX/ISPs that form the shortest path(s) between the set of customer sites that need to communicate. Through this design and selection process, the natural routes that stitch together these high bandwidth single hop lines with dedicated high bandwidth local loops to geographically separated customer sites to create a private tunnel through the internet between any two customer sites to provide frame relay quality service at substantially less cost.

Frame relay prior art WANs were considered highly desirable because they establish permanent virtual circuits with known paths having known bandwidth. The internet has not been able to provide a similar solution in the prior art. The AlterWAN network structure changes that by creating virtual private circuits or tunnels through the internet using only lines that are known to have sufficient bandwidth to carry the worst case load and by minimizing the number of hops by using primarily ISX providers. Prior attempts to use the internet for WANs have failed because the data paths were not controlled, the bandwidth was oversubscribed or in any fashion insufficient causing unacceptable latency and delays. This caused unpredictable latency which is very undesirable for multimedia video and audio traffic. Only light users with small amounts of non time sensitive data were able to use the internet successfully as a WAN. The AlterWAN network structure uses a set of known high bandwidth, usually fiber optic, links between major domestic and international cities and couples these data paths with dedicated point-to-point or frame relay circuits run locally from the "nearest" participating ISX/ISP (sometimes it is not the physically nearest ISX but is the nearest ISX with a high bandwidth line to a key city that is participating) to the customer site. The unique aspects are forcing the participating routers to stitch together known high bandwidth data paths with a minimum number of hops to high bandwidth dedicated local loop connections and encrypting all AlterWAN traffic for privacy.

Figure 4:
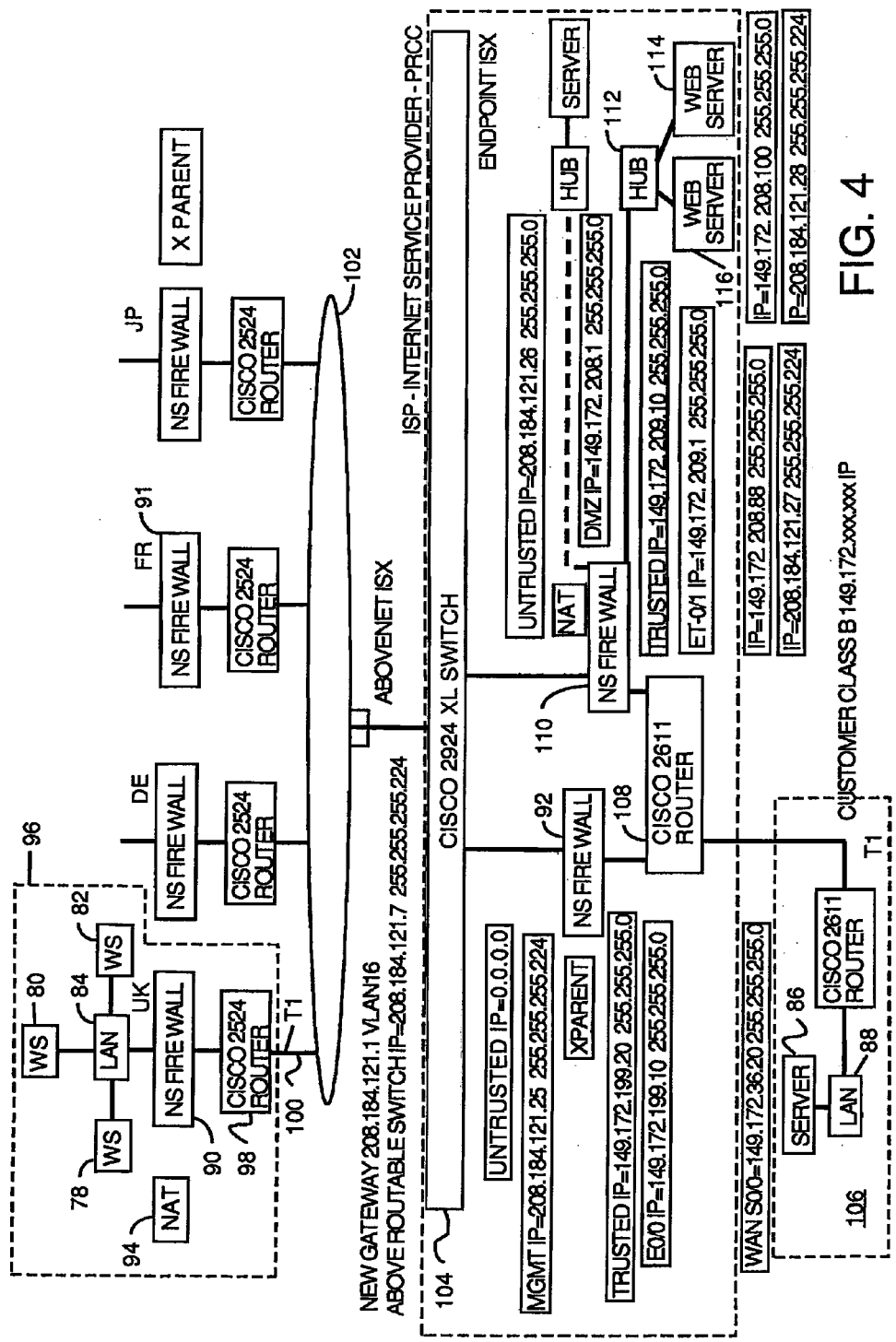
FIG. 4 is a block diagram of a typical AlterWAN network for a U.S. headquarters coupled to several international sites.

FIG. 4 is block diagram of a typical AlterWAN network for an international corporation with multiple international locations in the U.K., Germany, France and Japan with a headquarters in the U.S. Suppose one of workstations 78 through 82 on LAN 84 in the U.K. site 96 wants to have access to server 86 on LAN 88 at the U.S. headquarters. Workstations 78 generates an IP packet that gets encapsulated into an Ethernet or other LAN packet addressed to the firewall 90. The firewall looks up the IP address in its tables and determines that the packet is addressed to an AterWAN IP address in the U.S. headquarters. It then encrypts the payload portion of the packet using the prearranged key for the tunnel to the destination. The encrypted packet payload is sent through the "private tunnel" from the U.K. firewall 90 to the U.S. site firewall 92. Network address translation unit converts any IP addresses that conflict with private IP addresses owned by some other company to one IP address on the untrusted interface given by the participating ISX. Firewalls can handle both NAT addressing and transparent addressing, but that is not relevant to the invention.

After encryption, the AlterWAN packet is forwarded to router 98 at the U.K. site 96. This router examines every packet and based on the routing tables forwards packets to the next ISX. In this case, the router will only receive packets from the firewall if they were not for the local LAN. At this time, AlterWAN packets and conventional IP packets are equal, but AlterWAN traffic has "designed in" efficient routing paths to the destination points with the ISX/ISP connected by dedicated local loop line 100 that couples the router to the first participating ISX provider within internet cloud 102 via a known internal or external channel service unit. The router in the first participating ISX within the internet cloud receives the AlterWAN packets and routes them along the predetermined private tunnel data path that has been preplanned to use the natural routing table (unless a special case requires additional special routes). This process continues at each router of each ISX along the private tunnel to the U.S. site 106. The last participating ISX along the private tunnel is represented by switch 104. This switch has all AlterWAN packets destined for this location passing therethrough and may be used to keep track of traffic levels for purposes of billing. Billing can be based on fixed monthly connections and/or billing with a base fee and usage fee. Collection of the information to generate billing on base fee plus usage is from each location requiring such.

From switch 104, AlterWAN packets are routed to firewall 92 at the customer U.S. site where they are decrypted and sent to router 108 which outputs the packets onto LAN 88 where they are received and processed by server 86. Non AlterWAN packets routed by switch 104 to firewall 110 are either replies to general internet activity initiated on LAN 88 or outside traffic requests intended for the web servers 114 and 116 on the firewall DMZ. Any other traffic would be rejected by the firewall. These packets are not encrypted, and after the firewall 110 processes them, they are routed to a LAN hub 112 and sent from there to a web server 114 and another web server 116.

AlterWAN packets that originate at the U.K. or one of the other international sites and are addressed to another international site never go to switch 104. Instead an IP packet originating at, for example, the U.S. site and addressed to a device on the LAN at the French site, get routed through a private tunnel that extends from the U.K. firewall 90 to the French firewall 91. Thus, these packets never pass through switch 104.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

Appendix A to U.S. Pat. No. 7,111,163 is a typical list of configuration commands for the firewall at the headquarters site of a typical AlterWAN to establish a private tunnel through the internet from the headquarters to a destination site firewall including establishment of the IP address of the first ISX in the tunnel. Appendix B is a typical list of configuration commands for the destination site firewall at the other end of the private tunnel. Appendix C is a typical list of configuration commands to configure the router at the headquarters site. Appendix D is a typical list of configuration commands to configure the router at the destination site.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

I claim:

1. An apparatus, comprising:
an interface to receive packets;
circuitry to identify those packets of the received packets corresponding to a set of one or more predetermined addresses, to identify a set of one or more transmission paths associated with the set of one or more predetermined addresses, and to select a specific transmission path from the set of one or more transmission paths; and
an interface to transmit the packets corresponding to the set of one or more predetermined addresses using the specific transmission path;
wherein
each transmission path of the set of one or more transmission paths is associated with a reserved, non-blocking bandwidth, and
the circuitry is to select the specific transmission path to be a transmission path from the from the set of one or more transmission paths that corresponds to a minimum link cost relative to each other transmission path in the set of one or more transmission paths.

2. The apparatus of claim 1, wherein:
the set of transmission paths is limited to paths that include at least a path segment connecting a cooperating third party service provider.

3. The apparatus of claim 1, wherein:
the minimum link cost is dependent on at least one of quality of service, latency, a bandwidth, and a hop count; and
the circuitry is to select the specific transmission path dependent on provision of at least one of maximum quality of service, minimal latency, maximum and minimum hop count, relative to other transmission paths, if any, in the set of one or more transmission paths.

4. The apparatus of claim 1, wherein the interface to transmit the packets is to use at least one port to couple to a destination using a dedicated line.

5. The apparatus of claim 1, wherein the circuitry is to identify a set of one or more transmission paths meeting the minimum link cost by identifying a load, by identifying a set of known locations from a table, and pruning the set of known locations by eliminating those locations not associated with bandwidth sufficient to meet the load.

6. The apparatus of claim 1, wherein the minimum link cost includes a hop count.

7. The apparatus of claim 1, wherein the minimized link cost comprises a shortest path length.

8. The apparatus of claim 1, wherein the circuitry is to select the specific transmission path based on a list of participating ISX/ISP locations, pruned to eliminate locations that do not meet a threshold transmission criterion, and based on minimum link cost associated with each of the remaining participating ISX/ISP locations.

9. The apparatus of claim 1, wherein each interface is a wide area network (WAN) interface.

10. The apparatus of claim 1, wherein:
the circuitry is to transmit virtual private network (VPN) data represented by packets corresponding to the set of one or more predetermined addresses, using the specific transmission path; and
the circuitry is to encapsulate an encrypted version of the VPN data in another packet having an IP address for a known destination firewall.

11. The apparatus of claim 1, embodied in a network device of a private enterprise, where the interface to receive packets is to couple to a private network controlled by the private enterprise.

12. The apparatus of claim 1, wherein:
the circuitry is to receive packets intended for a private tunnel connection as well as packets intended for a public network; and
the circuitry is further to
compare at least one of a source address or destination address of a received packet with content of a table,
determine whether the received packet represents prioritized traffic dependent on whether the received packet is associated with an address in the set of one or more predetermined addresses,
if the received packet does represent prioritized traffic, to identify the minimum link cost, to identify the set of one or more transmission paths, and to select the specific transmission path, and
if the received packet does not represent prioritized traffic, to select a transmission path that is not part of the set of one or more transmission paths.

13. An apparatus, comprising:
an interface to receive packets;
means for identifying those packets of the received packets corresponding to a set of one or more predetermined addresses, means for identifying a set of one or more transmission paths associated with the set of one or more predetermined address, and means for selecting a specific transmission path from the set of one or more transmission paths; and an interface to transmit the packets corresponding to the set of one or more predetermined addresses using the specific transmission path;

wherein each transmission path of the set of one or more transmission paths is associated with a reserved, non-blocking bandwidth, and the means for selecting is to select the specific transmission path to be a transmission path from the from the set of one or more transmission paths that corresponds to a minimum link cost relative to each other transmission path in the set of one or more transmission paths.

14. An apparatus that receives IP packets and routes the IP packets across a wide area network to one or more locations, comprising:

storage to store a list of transmission paths associated with a reserved, non-blocking bandwidth;

circuitry to determine whether incoming traffic is represents priority traffic that is to be routed to a transmission path associated with the list;

circuitry to for incoming traffic that is to be routed to a transmission path in the list, select a specific transmission path based on a minimum link cost relative to any other transmission path in the list and transmit the traffic using the specific transmission path via at least one dedicated line, for other incoming traffic, transmit the other incoming traffic in a manner that does not include using the at least one dedicated line.

15. The apparatus of claim 14, wherein the minimum link cost is based on hop count.

16. The apparatus of claim 14, wherein the circuitry is further to encrypt and encapsulate at least some of the priority traffic to be routed to a transmission path associated with the list.

17. The apparatus of claim 14, wherein the circuitry is to identify a load and a set of known locations from a table, to prune the set of known locations to eliminate from the set locations not associated with bandwidth sufficient to meet the load, and to select between remaining locations in the list to identify the specific transmission path.

18. The apparatus of claim 14, where the circuitry is to select the specific transmission path dependent on at least one of a quality of service parameter, a latency parameter, a bandwidth parameter, and a hop count parameter.

19. The apparatus of claim 14, where the minimum link cost is dependent on a minimum latency, and where the minimum latency is dependent on a number of hops in a connection to a cooperating service provider.

20. The apparatus of claim 14, wherein:

the circuitry is to receive packets intended for a private tunnel connection as well as packets intended for a public network; and the circuitry is further to compare at least one of a source address or destination address of a received packet with content of the list, determine whether the received packet is part of the prioritized traffic dependent on whether the received packet is associated with an address represented by the content of the list, if the received packet is part of the prioritized traffic, to identify the minimum link cost and to select the specific transmission path, and if the received packet is not part of the prioritized traffic, to select a transmission path that is not in the list.

21. The apparatus of claim 14, wherein:

the priority traffic comprises packets associated with a set of one or more predetermined addresses; and the circuitry to determine whether incoming traffic is represents priority traffic is to compare an incoming packet with the set of one or more predetermined addresses, to detect existence of a match between the incoming packet and an address in the set of one or more predetermined address, and to identify the incoming packet as priority traffic in the event of a match.

* * * * *